United States Patent
Sung et al.

(10) Patent No.: US 12,322,373 B2
(45) Date of Patent: Jun. 3, 2025

(54) VIBRATION DEVICE AND APPARATUS INCLUDING THE SAME

(71) Applicant: LG Display Co., Ltd., Seoul (KR)

(72) Inventors: Seunghyun Sung, Paju-si (KR); YongWoo Lee, Paju-si (KR); Uihyeon Jeong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 833 days.

(21) Appl. No.: 17/559,977

(22) Filed: Dec. 22, 2021

(65) Prior Publication Data
US 2022/0208163 A1    Jun. 30, 2022

(30) Foreign Application Priority Data

Dec. 28, 2020   (KR) .......................... 10-2020-0184949

(51) Int. Cl.
| | | |
|---|---|---|
| *H10N 30/30* | (2023.01) | |
| *B60R 11/02* | (2006.01) | |
| *G06F 3/16* | (2006.01) | |
| *G10K 9/125* | (2006.01) | |

(52) U.S. Cl.
CPC .......... *G10K 9/125* (2013.01); *B60R 11/0235* (2013.01); *G06F 3/16* (2013.01)

(58) Field of Classification Search
CPC ................................ H10N 30/30; H04R 17/00
See application file for complete search history.

(56) References Cited

U.S. PATENT DOCUMENTS

| | | | |
|---|---|---|---|
| 2007/0071259 A1* | 3/2007 | Tojo ........................ | H04R 1/323 |
| | | | 381/388 |
| 2020/0314515 A1* | 10/2020 | Jang ..................... | H10K 59/8722 |
| 2020/0314551 A1* | 10/2020 | Kim ........................ | H04R 7/045 |
| 2020/0314556 A1* | 10/2020 | Lee ........................ | H10N 30/702 |

FOREIGN PATENT DOCUMENTS

| | | |
|---|---|---|
| CN | 101069341 A | 11/2007 |
| CN | 110854262 A | 2/2020 |
| CN | 111381672 A | 7/2020 |
| JP | 7-327297 A | 12/1995 |
| KR | 10-2019-0018251 A | 2/2019 |
| KR | 10-2020-0021392 A | 2/2020 |
| KR | 10-2020-0077138 A | 6/2020 |
| KR | 10-2020-0114914 A | 10/2020 |

* cited by examiner

*Primary Examiner* — Bryan P Gordon
(74) *Attorney, Agent, or Firm* — Birch, Stewart, Kolasch & Birch, LLP

(57) ABSTRACT

A vibration device can include a vibration generator including a vibration portion, in which the vibration portion includes a plurality of inorganic portions having piezoelectric characteristics, the plurality of inorganic portions being spaced apart from each other; and an organic portion disposed between at least two inorganic portions among the plurality of inorganic portions, the organic portion having non-piezoelectric characteristics. The organic portion includes a first organic portion and a second organic portion, the first organic portion being disposed between one of the plurality of inorganic portions and the second organic portion. Further, an elastic modulus of the first organic portion is lower than an elastic modulus of the second organic portion.

20 Claims, 13 Drawing Sheets

VIBRATION DEVICE AND APPARATUS INCLUDING THE SAME

CROSS-REFERENCE TO RELATED APPLICATIONS

This application claims priority to Korean Patent Application No. 10-2020-0184949 filed in the Republic of Korea on Dec. 28, 2020, which is hereby incorporated by reference in its entirety.

BACKGROUND

Technical Field

The present disclosure relates to a vibration device and an apparatus including the vibration device, and more particularly, to an apparatus including a vibration generating device having improved vibration characteristics.

Discussion of the Related Art

A display apparatus displays an image on a display panel, and a separate speaker can be installed to provide sound. When the speaker is disposed in the display apparatus, the speaker occupies a space, so there can be a limitation in that design and space arrangement of the display apparatus can be restricted.

Since sound output from the speaker moves backwards or downwards from the display apparatus, sound quality can be deteriorated due to the interference between sounds reflected from a wall or the ground. Therefore, it can be difficult to accurately transmit sound and a sense of immersion experience of a viewer or a user can be reduced.

SUMMARY OF THE DISCLOSURE

Therefore, the inventors of the present disclosure recognized the problems mentioned above and other limitations associated with the related art, and conducted various experiments to implement a vibration device in which sound quality can be improved and sound pressure level characteristics can be improved. Through various experiments, an apparatus having a new structure including a vibration device capable of improving sound quality and sound pressure level characteristics was invented by the present inventors.

Accordingly, the present disclosure is directed to provide a vibration device and an apparatus including the same that substantially obviate one or more problems due to limitations and disadvantages of the related art.

An aspect of the present disclosure is directed to provide a vibration device capable of generating sound by vibrating a display panel and having improved sound pressure level characteristics, and an apparatus including the vibration device.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, a vibration device can include a vibration generator including a vibration portion, in which the vibration portion includes a plurality of inorganic portions having piezoelectric characteristics, the plurality of inorganic portions being spaced apart from each other; and an organic portion between at least two inorganic portions among the plurality of inorganic portions, the organic portion having non-piezoelectric characteristics, the organic portion includes a first organic portion and a second organic portion, the first organic portion being disposed between one of the plurality of inorganic portions and the second organic portion, and an elastic modulus of the first organic portion is lower than an elastic modulus of the second organic portion.

In another aspect, an apparatus includes a vibration object and a vibration generating device disposed on one surface of the vibration object, in which the vibration generating device includes a vibration generator including a vibration portion, the vibration portion includes a plurality of inorganic portions having piezoelectric characteristics, the plurality of inorganic portions being spaced apart from each other; and an organic portion between at least two inorganic portions among the plurality of inorganic portions, the organic portion having non-piezoelectric characteristics, the organic portion includes a first organic portion and a second organic portion, the first organic portion being disposed between one of the plurality of inorganic portions and the second organic portion, and an elastic modulus of the first organic portion is lower than an elastic modulus of the second organic portion.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

Figure 1:
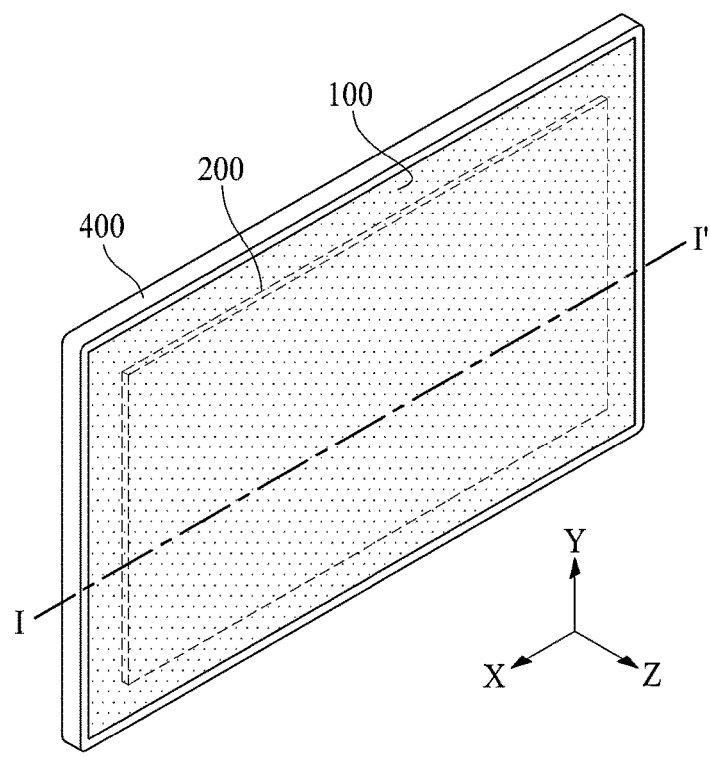
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF THE EMBODIMENTS

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example, however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error range or tolerance range although there is no explicit description of such an error or tolerance range.

In describing a position relationship, for example, when a position relation between two parts is described as, for example, "on," "above," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a situation that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed," or "interposed" between the elements or layers, unless otherwise specified.

The term "at least one" should be understood as including any and all combinations of one or more of the associated listed elements. For example, the meaning of "at least one of a first element, a second element, and a third element" denotes the combination of all items proposed from two or more of the first item, the second item, and the third item as well as the first item, the second item, or the third item.

In an embodiment of the present disclosure, examples of a display apparatus may include a narrow-sense display apparatus such as an organic light emitting display (OLED) module or a liquid crystal module (LCM) including a display panel and a driver for driving the display panel. Also, examples of the display apparatus can include a set device (or a set apparatus) or a set electronic device, such as a notebook computer, a TV, a computer monitor, an equipment apparatus including an automotive apparatus or another type apparatuses for vehicles, or a mobile electronic device, such as a smartphone or an electronic pad, which is a complete product (or a final product) including an LCM or an OLED module.

Therefore, in the present disclosure, examples of the display apparatus can include a narrow-sense display apparatus itself, such as an LCM or an OLED module, and a set device which is a final consumer device or an application product including the LCM or the OLED module.

Depending on the situation, an LCM or an OLED module including a display panel and a driver can be referred to as a narrow-sense display apparatus, and an electronic device which is a final product including an LCM or an OLED module can be referred to as a set device. For example, the narrow-sense display apparatus can include a display panel, such as an LCD or an OLED, and a source printed circuit board (PCB) which is a controller for driving the display panel. The set device can further include a set PCB which is a set controller electrically connected to the source PCB to overall control the set device.

A display panel applied to the present embodiment can use all types of display panels such as a liquid crystal display panel, an organic light emitting diode (OLED) display panel, and an electroluminescent display panel, but is not limited to a specific display panel which is vibrated by a sound generating device according to an embodiment to of the present disclosure output a sound. Also, a shape or a size of a display panel applied to a display apparatus according to an embodiment of the present disclosure is not limited.

For example, if the display panel is the liquid crystal display panel, the display panel can include a plurality of gate lines, a plurality of data lines, and a plurality of pixels respectively provided in a plurality of pixel areas defined by intersections of the gate lines and the data lines. Also, the display panel can include an array substrate including a TFT (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel can include a plurality of gate lines, a plurality of data lines, and a plurality of pixels respectively provided in a plurality of pixel areas defined by intersections of the gate lines and the data lines. Also, the display panel can include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate can protect the TFT and the organic light emitting device layer from an external impact and can prevent water or oxygen from penetrating into the organic light emitting device layer. Also, a layer provided on the array substrate can include an inorganic light emitting layer (for example, a nano-sized material layer, a quantum dot, or the like).

Moreover, the display panel can further include a backing such as a metal plate attached on the display panel. However, the present embodiment is not limited to the metal plate, and the display panel can include another structure.

In the present disclosure, the apparatus including the vibration device can be implemented as a user interface module, such as a central control panel in an automobile. For example, such a display panel can be configured between two front seat occupants, such that sounds due to a vibration of the display panel propagate towards the interior of the vehicle. As such, the audio experience within a vehicle can be improved as compared to having speakers at the interior sides or edges of the vehicle.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, the embodiments of the present disclosure will be described through the accompanying drawings and embodiments as follows. The scales of the components shown in the drawings have different scales from the actual ones for convenience of explanation, and thus are not limited to the scales shown in the drawings. All the components of each display apparatus according to all embodiments of the present disclosure are operatively coupled and configured.

Figure 2:
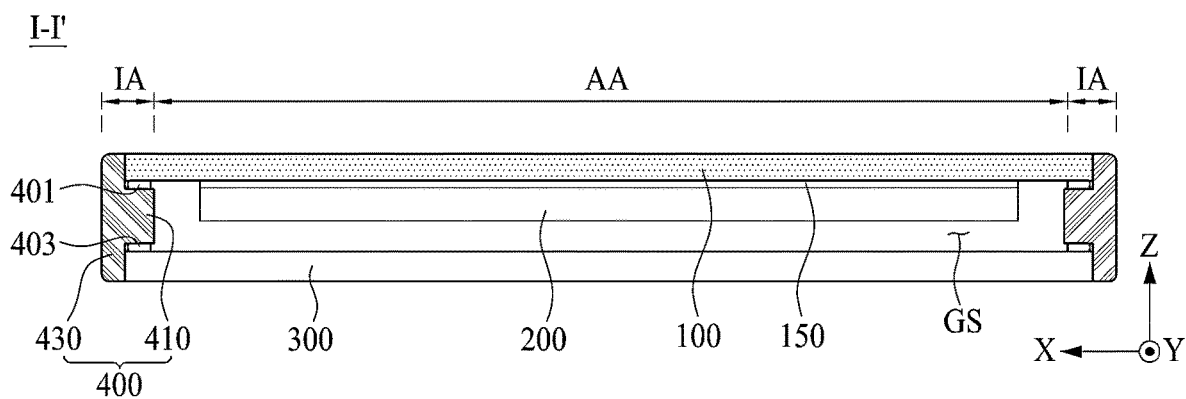
FIG. 2 is a cross-sectional view taken along line I-I' illustrates in FIG. 1 according to an embodiment of the present disclosure.

FIG. 1 illustrates a display apparatus according to an embodiment of the present disclosure, and FIG. 2 is a cross-sectional view taken along line I-I' shown in FIG. 1.

With reference to FIGS. 1 and 2, the display apparatus according to the embodiment of the present disclosure can include a display panel 100 for displaying an image and a vibration device 200 that vibrates the display panel 100 from a rear surface (or back surface) of the display panel 100.

The display panel 100 can display an image, for example, an electronic image or a digital image. For example, the display panel 100 can display an image by outputting light. The display panel 100 can be any type of display panel or a curved display panel, such as a liquid crystal display panel, an organic light emitting display panel, a quantum dot light emitting display panel, a micro light emitting diode display panel, and an electrophoretic display panel. The display panel 100 can be a flexible display panel. For example, the display panel 100 can be a flexible light emitting display panel, a flexible electrophoretic display panel, a flexible electrowetting display panel, a flexible micro light emitting diode (LED) display panel, or a flexible quantum dot light emitting display panel, but embodiments of the present disclosure are not limited thereto.

The display panel 100 according to an embodiment of the present disclosure can include a display area AA for displaying an image according to driving of a plurality of pixels. Also, the display panel 100 can further include a non-display area IA surrounding the display area AA, but embodiments of the present disclosure are not limited thereto.

The display panel 100 according to an embodiment of the present disclosure can include an anode electrode, a cathode electrode, and a light emitting device, and can display an image according to a top emission method, a bottom emission method, or a dual emission method depending on a structure of a pixel array layer including a plurality of pixels. In the top emission method, light generated from the pixel array layer is emitted to the front of a base substrate to display an image, and in the bottom emission method, light generated from the pixel array layer is emitted to the rear of the base substrate to display an image.

The display panel 100 according to an embodiment of the present disclosure can include a pixel array portion disposed on a display area of a substrate. The pixel array portion can include a plurality of pixels that display an image according to signals supplied to signal lines. The signal lines can include, but embodiments of the present disclosure are not limited to, a gate line, a data line, and a pixel driving power line.

Each of the plurality of pixels can include a pixel circuit layer including a driving thin film transistor (TFT) provided in a pixel area formed by a plurality of gate lines and/or a plurality of data lines, an anode electrode electrically connected to the driving TFT, a light emitting device formed on the anode electrode, and a cathode electrode electrically connected to the light emitting device.

The driving TFT can be configured in a transistor region of each pixel area disposed on the substrate. The driving TFT can include a gate electrode, a gate insulating layer, a semiconductor layer, a source electrode, and a drain electrode. The semiconductor layer of the TFT can include silicon such as a-Si, poly-Si, or low-temperature poly-Si, or an oxide such as indium-gallium-zinc-oxide (IGZO), but embodiments of the present disclosure are not limited thereto.

The anode electrode (or pixel electrode) can be provided in an opening region disposed in each pixel area to be electrically connected to the driving TFT.

The light emitting device according to an embodiment of the present disclosure can include an organic light emitting device layer formed on the anode electrode. The organic light emitting device layer can be implemented to emit light of the same color, for example, white, for each pixel, or can be implemented to emit light of a different color, for example, red, green, or blue light for each pixel. The cathode electrode (or common electrode) can be commonly connected to the organic light emitting device layer provided in each pixel area. For example, the organic light emitting device layer can have a single structure including the same color for each pixel or a stack structure including two or more structures.

In another embodiment of the present disclosure, the organic light emitting device layer can have a stack structure including two or more structures including one or more different colors for each pixel. The two or more structures including one or more different colors can include one or more of blue, red, yellow-green, and green, or a combination thereof, but embodiments of the present disclosure are not limited thereto. Examples of the combinations can include, but embodiments of the present disclosure are not limited to, blue and red, red and yellow-green, red and green, and red/yellow green/green. And, it can be applied irrespective of a stacking order thereof. A stack structure including two or more structures having the same color or one or more different colors can further include a charge generating layer between the two or more structures. The charge generating layer can have a PN junction structure, and can include an N-type charge generating layer and a P-type charge generating layer.

A light emitting device according to another embodiment of the present disclosure can include a micro light emitting diode device electrically connected to each of an anode electrode and a cathode electrode. The micro light emitting diode device can be a light emitting diode implemented in the form of an integrated circuit (IC) or a chip. The micro light emitting diode device can include a first terminal electrically connected to the anode electrode and a second terminal electrically connected to the cathode electrode. The cathode electrode can be commonly connected to the second terminal of the micro light emitting diode device provided in each pixel area.

An encapsulation portion can be formed on the substrate to surround the pixel array portion, thereby preventing oxygen or moisture from penetrating into the light emitting device of the pixel array portion. The encapsulation portion according to an embodiment of the present disclosure can be formed in a multi-layer structure in which an organic material layer and an inorganic material layer are alternately stacked, but embodiments of the present disclosure are not limited thereto. The inorganic material layer can block oxygen or moisture from penetrating into the light emitting device layer of the pixel array portion. The organic material layer can be formed to have a thickness larger than that of the inorganic material layer to cover particles that can occur during a manufacturing process, but embodiments of the present disclosure are not limited thereto. For example, the encapsulation portion can include a first inorganic layer, an organic layer on the first inorganic layer, and a second inorganic layer on the organic layer. The organic layer can be a particle cover layer, and the term is not limited thereto. A touch panel can be disposed on the encapsulation portion, or can be disposed on a rear surface of the pixel array portion or within the pixel array portion.

The display panel 100 according to an embodiment of the present disclosure can include a first substrate, a second substrate, and a liquid crystal layer. The first substrate can be an upper substrate or a TFT array substrate. For example, the first substrate can include a pixel array (or a display portion or a display area) having a plurality of pixels formed in a pixel area intersected by a plurality of gate lines and/or a plurality of data lines. Each of the plurality of pixels can include a TFT connected to a gate line and/or a data line, a pixel electrode connected to the TFT, and a common electrode formed adjacent to the pixel electrode and receive a common voltage supplied thereto.

The first substrate can further include a pad portion provided on a first edge (or a non-display portion) and a gate driving circuit provided on the second edge (or a second non-display portion).

The pad portion can supply a signal supplied from the outside to the pixel array and/or the gate driving circuit. For example, the pad portion can include a plurality of data pads connected to a plurality of data lines by a plurality of data link lines and/or a plurality of gate input pads connected to a gate driving circuit through a gate control signal line. For example, a size of the first substrate can be greater than a size of the second substrate, but embodiments of the present disclosure are not limited thereto.

The gate driving circuit can be embedded (or integrated) on the second edge of the first substrate to be connected to the plurality of gate lines. For example, the gate driving circuit can be implemented as a shift resistor including a transistor formed by the same process as the TFT provided in the pixel area. The gate driving circuit according to another embodiment of the present disclosure may not be embedded in the upper substrate but can be included in a panel driving circuit in the form of an integrated circuit.

The second substrate can be a lower substrate or a color filter array substrate. For example, the second substrate can include a pixel that can include an opening region overlapping the pixel area formed in the first substrate and a color filter layer formed in the opening region. The second substrate can have a size smaller than that of the first substrate, but embodiments of the present disclosure are not limited thereto. For example, the second substrate can overlap a portion other than the first edge of the first substrate. The second substrate can be bonded to the rest except for the first edge of the first substrate with the liquid crystal layer therebetween by a sealant.

The liquid crystal layer can be disposed between the first substrate and the second substrate. The liquid crystal layer can include a liquid crystal in which an arrangement direction of liquid crystal molecules is changed according to an electric field formed by a data voltage and a common voltage applied to the pixel electrode in each pixel.

A second polarizing member can be attached to a lower surface of the second substrate to polarize light incident from a backlight and travel to the liquid crystal layer. A first polarizing member can be attached to an upper surface of the first substrate to polarize light emitted to the outside through the first substrate.

The display panel 100 according to an embodiment of the present disclosure can display an image according to light transmitting through the liquid crystal layer by driving the liquid crystal layer according to an electric field formed in each pixel by the data voltage and the common voltage applied for each pixel.

In the display panel 100 according to another embodiment of the present disclosure, a first substrate can be formed as a color filter array substrate, and a second substrate can be formed as a TFT array substrate. For example, the display panel 100 according to another embodiment of the present disclosure can have a shape in which the display panel 100 according to an embodiment of the present disclosure is vertically inverted. In this situation, the pad portion of the display panel 100 according to another embodiment of the present disclosure can be covered by a separate mechanism.

The display panel 100 according to another embodiment of the present disclosure can include a bent portion bent or curved to have a curved shape or a constant radius of curvature.

The bent portion of the display panel 100 can be implemented on at least one of one edge portion and the other edge portion of the display panel 100 that are parallel to each other. One edge and/or the other edge of the display panel 100 implementing the bent portion can include only a non-display area IA or the edge of the display area AA and the non-display area IA. The display panel 100 including the bent portion implemented by bending of the non-display area IA can have a one-sided bezel bending structure or a double-sided bezel bending structure. In addition, the display panel 100 including the bent portion implemented by bending the edge of the display area AA and the non-display area IA can have one side active bending structure or both side active bending structure.

The vibration device 200 can provide acoustic and/or haptic feedback to a user based on vibration of the display panel 100 by vibrating the display panel 100 from the rear surface of the display panel 100. The vibration device 200 can be implemented on a rear surface of the display panel 100 to directly vibrate the display panel 100.

As an embodiment of the present disclosure, the vibration device 200 can vibrate the display panel 100 by vibrating according to a vibration driving signal synchronized with an image displayed on the display panel 100. As another embodiment of the present disclosure, the vibration device 200 can vibrate the display panel 100 by vibrating according to a haptic feedback signal (or tactile feedback) synchronized with a user's touch on a touch panel (or a touch sensor layer) disposed on the display panel 100 or embedded in the display panel 100. Accordingly, the display panel 100 can vibrate according to the vibration of the vibration device 200 to provide at least one of acoustic and haptic feedback or both to the user (or a viewer).

The vibration device 200 according to an embodiment of the present disclosure can be implemented with a size corresponding to the display area AA of the display panel 100. The size of the vibration device 200 can be 0.9 to 1.1 times the size of the display area AA, but embodiments of the present disclosure are not limited thereto. For example, the size of the vibration device 200 can be the same as or smaller than the size of the display area AA. The vibration device 200 can have a rectangular shape that can be substantially the same size as a rectangular shaped display (e.g., see FIG. 1). For example, since the size of the vibration device 200 can be the same as or substantially the same as the size of the display area AA of the display panel 100, the vibration device 200 can cover most of the area of the display panel 100, and since vibration generated by the vibration device 200 can vibrate the entire display panel 100, a sense of location of sound can be high and user satisfaction can be improved. Also, since a contact area (or panel coverage) between the display panel 100 and the vibration device 200 increases, a vibration area of the display panel 100 can increase, so that sound in the low and middle pitched sounds generated according to vibration of the display panel 100 can be further improved to implement an improved sound effect. In addition, since the vibration device 200 applied to a large display apparatus can vibrate the entire large (or large area) display panel 100, the sense of localization of sound according to vibration of the display panel 100 can be further improved to implement improved sound effects. Accordingly, the vibration device 200 according to an embodiment of the present disclosure can be disposed on the rear surface of the display panel 100 to sufficiently vibrate the display panel 100 in the up-down (or front-rear) direction, so that sound can be output to the front of the apparatus or the display apparatus.

The vibration device 200 according to an embodiment of the present disclosure can be implemented in the form of a film. Since the vibration device 200 is implemented in the form of a film, it can have a thickness that is smaller than a thickness of the display panel 100, so that an increase in the thickness of the display apparatus due to the arrangement of the vibration device 200 can be minimized. For example, the vibration device 200 can be expressed as a sound generating module, a sound generating device, a film actuator, a film-type piezoelectric composite actuator, a film speaker, a film-type piezoelectric speaker, or a film-type piezoelectric composite speaker using the display panel 100 as a sound vibration plate, but embodiments of the present disclosure are not limited to this term. For example, the display panel can be a display panel having pixels for displaying an image and a screen panel on which an image is projected from the display apparatus, but embodiments of the present disclosure are not limited thereto.

In another embodiment of the present disclosure, the vibration device 200 may not be disposed on the rear surface of the display panel 100 and can be applied to a vibration object other than the display panel. For example, the vibration object can be a non-display panel, a vibrating plate, wood, plastic, glass, cloth, an interior material of a vehicle, a glass window of a vehicle, an interior ceiling of a building, a glass window of a building, interior material of an aircraft, and a glass window of an aircraft, etc., but embodiments of the present disclosure are not limited thereto. For example, the non-display panel can be a light emitting diode lighting panel (or apparatus), an organic light emitting lighting panel (or device), or an inorganic light emitting lighting panel (or apparatus), but embodiments of the present disclosure are not limited thereto. In this situation, a vibration object can be applied as a vibration plate, and the vibration device 200 can vibrate the vibration object to output sound.

The vibration device 200 according to an embodiment of the present disclosure can include at least one vibration generator 230.

The vibration generator 230 can include a piezoelectric structure (vibration portion or piezoelectric vibration portion) including a piezoelectric ceramic having piezoelectric characteristics, but embodiments of the present disclosure are not limited thereto. For example, the vibration generator 230 according to an embodiment of the present disclosure can vibrate (or mechanically displace) in response to an externally applied electrical signal by including a piezoelectric ceramic having a perovskite-based crystal structure. For example, when a vibration driving signal (or voice signal) is applied, the vibration generator 230 alternately repeats contraction and expansion due to a reverse piezoelectric effect of the piezoelectric structure (vibration portion or piezoelectric vibration portion) to displace (or vibrate) in the same direction due to a bending phenomenon in which a bending direction is alternately changed, whereby the amount of displacement (or bending force or flexural force) or amplitude displacement of the vibration device 200 and/or the display panel 100 can be increased or maximized.

Alternatively, in the vibration device 200 according to another embodiment of the present disclosure, a plurality of vibration generators can be overlapped or stacked with each other to be displaced (or driven) in the same direction as each other. For example, each of the plurality of vibration generators can contract or expand in the same driving direction (or displacement direction) according to a vibration driving signal in a state in which they are overlapped or stacked with each other so that the displacement amount (or bending force) or amplitude displacement can be increased or maximized. Through this, the plurality of vibration generators increases (or maximizes) the displacement amount (or bending force) or amplitude displacement of the display panel 100, thereby improving sound characteristics in the middle and low pitched sound band and sound pressure level characteristics of the sound generated according to the vibration of the display panel 100. For example, the plurality of vibration generators can be implemented to overlap or stack with each other to have the same driving direction, so that driving force of the plurality of vibration generators can be increased or maximized, and accordingly, sound pressure level characteristics generated in the display panel 100 according to vibration of the plurality of vibration generators can be improved The display apparatus according to an embodiment of the present disclosure can further include a connection member 150 disposed between the vibration generator 230 and the display panel 100.

According to an embodiment of the present disclosure, the connection member 150 can include at least one substrate and an adhesive layer attached to one or both surfaces of the substrate.

According to an embodiment of the present disclosure, the connection member 150 can be formed of a material including an adhesive layer having excellent adhesion or adhesiveness to the vibration generator 230. For example, the connection member 150 can include a foam pad, a double-sided tape, or an adhesive, but embodiments of the present disclosure are not limited thereto. For example, the adhesive layer of the connection member 150 can include an epoxy, an acryl-based polymer, a silicone-based polymer, or a polyurethane-based polymer, but embodiments of the present disclosure are not limited thereto.

The connection member 150 according to another embodiment of the present disclosure can include at least one of a heat-curable adhesive, a light-curable adhesive, and a heat-sealable adhesive. For example, the connection member 150 can include a heat-sealing adhesive. The heat-sealing adhesive can be of a heat-active type or a thermosetting type. For example, the connection member 150 including a heat-sealing adhesive can adhere or couple the display panel 100 and the vibration generator 230 to each other by heat and pressure.

The connection member 150 can be disposed between the display panel 100 and the vibration device 200 to connect or couple the vibration device 200 to the rear surface of the display panel 100. For example, the vibration device 200 can be connected or coupled to the rear surface of the display panel 100 through the connection member 150 to be supported or disposed on the rear surface of the display panel 100.

The connection member 150 according to an embodiment of the present disclosure can be formed of a material including an adhesive layer having excellent adhesion or adhesiveness to each of the rear surface of the display panel 100 and the vibration device 200. For example, the connection member 150 can include a foam pad, a double-sided tape, or an adhesive, but embodiments of the present disclosure are not limited thereto. For example, the adhesive layer of the connection member 150 can include an epoxy-based polymer, an acryl-based polymer, a silicone-based polymer, or a urethane-based polymer, but embodiments of the present disclosure are not limited thereto. For example, the adhesive layer of the connection member 150 can include an acryl-based material having relatively excellent adhesive strength and high hardness among acrylic and urethane. Accordingly, the vibration of the vibration device 200 can be properly transmitted to the display panel 100.

The connection member 150 according to another embodiment of the present disclosure can further include a hollow portion provided between the display panel 100 and the vibration device 200. The hollow portion of the connection member 150 can provide an air gap between the display panel 100 and the vibration device 200. The air gap allows sound waves (or sound pressure level) according to vibration of the vibration device 200 to be concentrated on the display panel 100 without being dispersed by the connection member 150, thereby minimizing loss of vibration by the connection member 150. For example, the hollow portion of the connection member 150 can help form a type of resonance chamber behind the display panel. Therefore, sound pressure level characteristics of the sound generated according to an embodiment of the vibration of the display panel 100 can be increased.

The device according to an embodiment of the present disclosure can further include a support member 300 disposed on the rear surface of the display panel 100.

The support member 300 can cover the rear surface of the display panel 100. For example, the support member 300 can cover the entire rear surface of the display panel 100 with a gap space GS therebetween. For example, the support member 300 can include at least one of a glass material, a metal material, and a plastic material. For example, the support member 300 can be a rear structure or a set structure. For example, the support member 300 can be expressed by other terms such as a cover bottom, a plate bottom, a back cover, a base frame, a metal frame, a metal chassis, chassis base, or m-chassis. Accordingly, the support member 300 can be implemented as any type of frame or plate-shaped structure disposed on the rear surface of the display panel 100.

The device according to an embodiment of the present disclosure can further include a middle frame 400.

The middle frame 400 can be disposed between a rear edge of the display panel 100 and a front edge portion of the support member 300. The middle frame 400 supports at least one of an edge portion of the display panel 100 and an edge portion of the support member 300 and surrounds at least one of side surfaces of each of the display panel 100 and the support member 300. The middle frame 400 can provide a gap space GS between the display panel 100 and the support member 300. The middle frame 400 can be expressed as a middle cabinet, a middle cover, or a middle chassis, and embodiments of the present disclosure are not limited to the term.

The middle frame 400 according to an embodiment of the present disclosure can include a first support portion 410 and a second support portion 430.

The first support portion 410 can be disposed between the rear edge of the display panel 100 and the front edge of the support member 300, thereby providing a gap space GS between the display panel 100 and the support member 300. The front surface of the first support portion 410 can be coupled to or connected to the rear edge portion of the display panel 100 via a first frame connection member 401. The rear surface of the first support portion 410 can be coupled to or connected to the front edge portion of the support member 300 via a second frame connection member 403. For example, the first support portion 410 can have a single frame structure in a square shape or a frame structure having a plurality of divided bar shapes.

The second support portion 430 can be vertically coupled to an outer surface of the first support portion 410 to be parallel to the thickness direction Z of the device. The second support portion 430 can surround at least one of the outer surface of the display panel 100 and the outer surface of the support member 300 to protect the outer surface of each of the display panel 100 and the support member 300. The first support portion 410 can protrude from the inner surface of the second support portion 430 toward the gap space GS between the display panel 100 and the support member 300.

Figure 3:
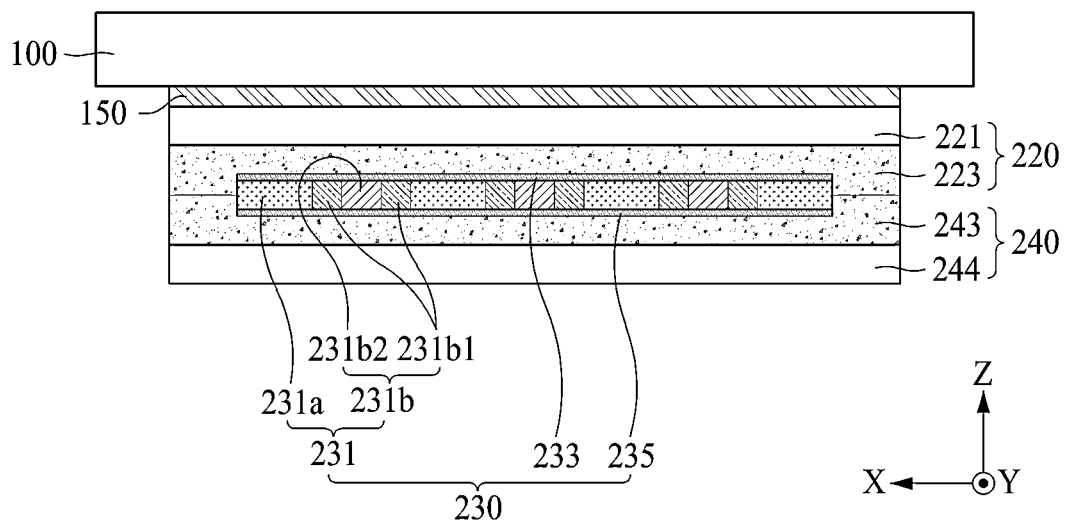
FIG. 3 is a cross-sectional view illustrating a vibration device connected to a display panel according to an embodiment of the present disclosure.
Figure 4:
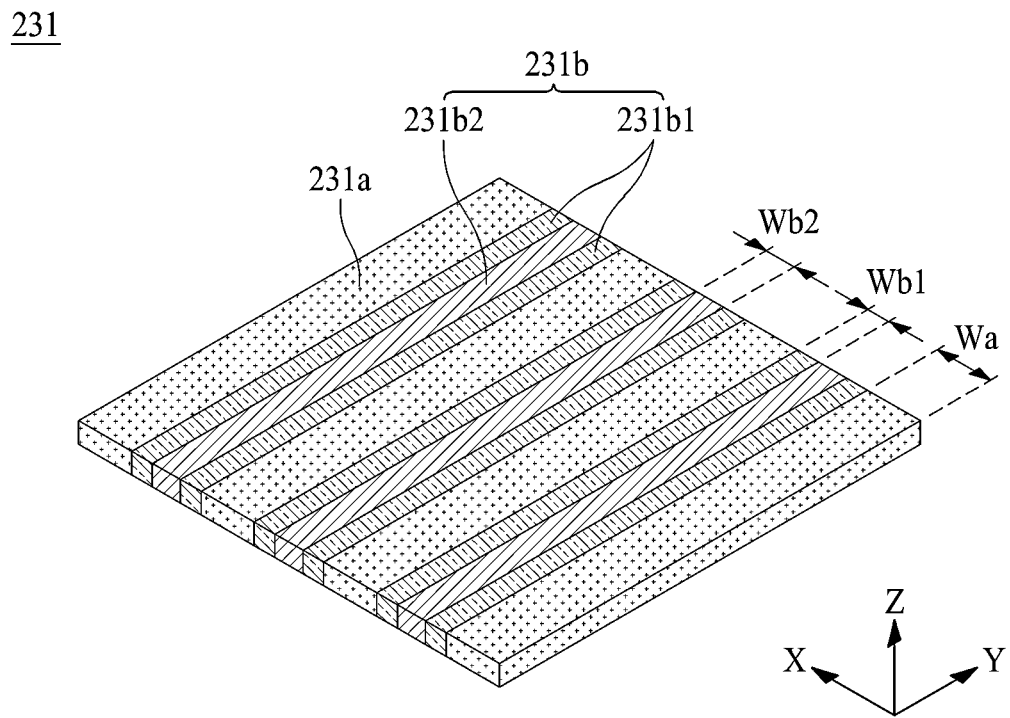
FIG. 4 is a perspective view of a vibration portion according to an embodiment of the present disclosure.

FIG. 3 is a cross-sectional view illustrating a vibration generating device of a display apparatus according to an embodiment of the present disclosure, and FIG. 4 is a perspective view of a vibration portion according to an embodiment of the present disclosure.

With reference to FIGS. 3 and 4, in the display apparatus according to an embodiment of the present disclosure, the vibration device 200 disposed on the rear surface of the display panel 100 can include at least one vibration generator 230.

The vibration portion 231 can include a piezoelectric material having a piezoelectric effect, a composite piezoelectric material, or an electroactive material. The vibration portion 231 can include an inorganic material and an organic material. For example, the vibration portion 231 can include a plurality of inorganic material portions formed of a piezoelectric material and at least one organic material portion formed of a soft material. For example, the vibration portion 231 can be expressed as a vibration unit, a piezoelectric vibration portion, a piezoelectric composite layer, a piezoelectric composite, or a piezoelectric ceramic composite, but embodiments of the present disclosure are not limited thereto. Since the vibration portion 231 can be formed of a transparent, semi-transparent, or opaque piezoelectric material, it can be transparent, semi-transparent, or opaque. The vibration portion 231 or the vibration generator 230 can be expressed as a vibration unit, a flexible vibration generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, etc., but embodiments of the present disclosure are not limited thereto.

The vibration portion 231 according to an embodiment of the present disclosure can include a plurality of inorganic portions 231a and a plurality of organic portions 231b. For example, the plurality of inorganic portions 231a and the plurality of organic portions 231b can be alternately and repeatedly disposed along a first direction X (or a second direction Y). For example, the first direction X can be a horizontal direction of the vibration portion 231, and the second direction Y can be a vertical direction of the vibration portion 231 intersecting the first direction X, but embodiments of the present disclosure are not limited thereto. For example, the first direction X can be a vertical direction of the vibration portion 231, and the second direction Y can be a horizontal direction of the vibration portion 231.

Each of the plurality of inorganic portions 231a can be formed of an inorganic material portion. The inorganic material portion can include the material mentioned above. For example, the inorganic portion 231a can be formed of a ceramic-based material capable of realizing a relatively high vibration or a piezoelectric ceramic having a perovskite-based crystal structure. The perovskite-based crystal structure has a piezoelectric and/or reverse piezoelectric effect and can be a plate-shaped structure having orientation. The perovskite-based crystal structure is represented by a chemical formula of $ABO_3$, an A site can be formed of a divalent metal element, and a B site can be formed of a tetravalent metal element. As an embodiment of the present disclosure, in the formula of $ABO_3$, the A site and the B site can be cations, and O can be anions. For example, it can include at least one of $PbTiO_3$, $PbZrO_3$, $PbZrTiO_3$, $BaTiO_3$, and $SrTiO_3$, but embodiments of the present disclosure are not limited thereto.

The inorganic portion 231a according to an embodiment of the present disclosure can include at least one of lead (Pb), zirconium (Zr), titanium (Ti), zinc (Zn), nickel (Ni), and niobium (Nb), but embodiments of the present disclosure are not limited thereto.

In another embodiment of the present disclosure, the inorganic portion 231a can have a piezoelectric constant $d_{33}$ of 1,000 pC/N or more in a thickness direction Z. Having a high piezoelectric constant $d_{33}$, the vibration device 200 can be applied to a large-sized display panel or can have sufficient vibration characteristics or piezoelectric characteristics. For example, the inorganic portion 231a can have a PZT-based material ($PbZrTiO_3$) as a main component and can include a softener dopant material doped to the A site (Pb), and a relaxer ferroelectric material doped to the B site (ZrTi).

The softener dopant material can improve piezoelectric and dielectric properties of the inorganic portion 231a, for example, can increase the piezoelectric strain coefficient $d_{33}$ of the inorganic portion 231a. When the softener dopant material includes a +1 valent element, piezoelectric properties and dielectric properties can be reduced. For example, when the softener dopant material includes potassium (K) and rubidium (Rb), the piezoelectric properties and dielectric properties can be reduced. Accordingly, it was recognized through various experiments that the softener dopant material should include +2-valent to +3-valent elements in order to improve the piezoelectric properties and dielectric properties. The softener dopant material according to an embodiment of the present disclosure can include a +2-valent to +3-valent element. Since a morphotropic phase boundary (MPB) can be configured by including a softener dopant material in the PZT-based material ($PbZrTiO_3$), piezoelectric properties and dielectric properties can be improved. For example, the softener dopant material can be strontium (Sr), barium (Ba), lanthanum (La), niobium (Nb), calcium (Ca), yttrium (Y), erbium (Er), or ytterbium (Yb).

For example, ions ($Sr^{2+}$, $Ba^{2+}$, $La^{2+}$, $Nb^{5+}$, $Ca^{2+}$, $Y^{3+}$, $Er^{3+}$, $Yb^{3+}$) of the softener dopant material doped in the PZT-based material ($PbZrTiO_3$) substitutes a part of lead (Pb) in the PZT-based material ($PbZrTiO_3$), and the substitution amount can be 2 to 20 mol %. For example, if the substitution amount is less than 2 mol % or exceeds 20 mol %, the perovskite-based crystal structure is broken, so that the electromechanical coupling coefficient (kp) and the piezoelectric strain coefficient $d_{33}$ can decrease. When the softener dopant material is substituted, a morphotropic phase boundary region can be formed and high piezoelectric properties and dielectric properties can be obtained in the phase transition boundary region, so that a vibration device having high piezoelectric properties and dielectric properties can be realized.

According to an embodiment of the present disclosure, the relaxer ferroelectric material doped in the PZT-based material ($PbZrTiO_3$) can improve electric deformation characteristics of the inorganic portion 231a. The relaxer ferroelectric material according to an embodiment of the present disclosure can include a lead magnesium niobate (PMN)-based material or a lead nickel niobate (PNN)-based material, but embodiments of the present disclosure are not limited thereto. The PMN-based material can include lead (Pb), magnesium (Mg), and niobium (Nb) and can be, for example, $Pb(Mg, Nb)O_3$. The PNN-based material can include lead (Pb), nickel (Ni), and niobium (Nb) and can be, for example, $Pb(Ni, Nb)O_3$. For example, a relaxer ferroelectric material doped in a PZT-based material ($PbZrTiO_3$) substitutes a part of each of zirconium (Zr) and titanium (Ti) in the PZT-based material ($PbZrTiO_3$), and the substitution amount can be 5 to 25 mol %. For example, if the substitution amount is less than 5 mol % or exceeds 25 mol %, the perovskite-based crystal structure is broken, so that the electromechanical coupling coefficient (kp) and the piezoelectric strain coefficient $d_{33}$ can decrease.

According to an embodiment of the present disclosure, the inorganic portion 231a can further include a donor material doped in the B site (ZrTi) of the PZT-based material ($PbZrTiO_3$) to further improve the piezoelectric coefficient. For example, the donor material doped in the B site (ZrTi) can include a +4-valent to +6-valent element. For example, the donor material doped in the B site (ZrTi) can include tellurium (Te), germanium (Ge), uranium (U), bismuth (Bi), niobium (Nb), tantalum (Ta), and antimony (Sb), or tungsten (W).

Since the inorganic portion 231a according to an embodiment of the present disclosure can have a piezoelectric strain coefficient $d_{33}$ of 1,000 pC/N or more in the thickness direction Z, a vibration device having improved vibration characteristics can be implemented. For example, a vibration device having improved vibration characteristics can be implemented in a device having a large area.

In the vibration portion 231, each of the plurality of inorganic portions 231a, the plurality of first organic portions 231b1, and the plurality of second organic portions 231b2 can be disposed (or arranged) parallel to each other on the same plane (or on the same layer). Each of the plurality of first organic portions 231b1 and the plurality of second organic portions 231b2 can be configured to fill a gap between two adjacent inorganic portions 231a. Each of the plurality of first organic portions 231b1 can be connected to or adhered to an adjacent inorganic portion 231a. Each of the plurality of organic portions 231b can be configured to fill the gap between the two adjacent inorganic portions 231a, and thus can be connected to or adhered to the adjacent inorganic portions 231a. Accordingly, the vibration portion 231 can be expanded to a desired size or length by lateral coupling (or connection) of the inorganic portion 231a and the organic portion 231b. For example, the vibration portion 231 can have a modular design that can be easily increased or decreased in size, as desired (e.g., to correspond to certain sized displays or panels, and provide desired frequency ranges).

The vibration generator 230 according to an embodiment of the present disclosure can include a vibration portion 231 including a piezoelectric material, a first electrode portion 233 disposed on a first surface of the vibration portion 231, and a second electrode portion 235 disposed on a second surface opposite to the first surface of 231.

The vibration portion 231 can include an inorganic portion 231a including a piezoelectric material and an organic portion 231b including a polymer material.

For example, the inorganic portions 231a can be provided to be spaced apart from each other by a predetermined distance, and for example, the inorganic portion 231a can have a predetermined width Wa in the first direction X can have a predetermined length in the second direction Y intersecting the first direction X. Also, the inorganic portion 231a can be adjusted to have a predetermined thickness in the third direction Z.

For example, the width Wa of the inorganic portion 231a in the first direction X can be adjusted to a length of 1 to 2 mm. The length of the inorganic portion 231a in the second direction Y can be variably changed according to a position where it is attached to the rear surface of the display panel 100. For example, the length of the inorganic portion 231a in the second direction Y can be adjusted to several times or tens of times of the width Wa of the inorganic portion 231a in the first direction X. The length or thickness of the inorganic portion 231a in the third direction Z perpendicular to the first direction X and the second direction Y can be adjusted to 100 μm to 500 μm. Also, the length or thickness of the inorganic portion 231a in the third direction Z perpendicular to the first direction X and the second direction Y can be adjusted to 250 μm to 350 μm, or 300 μm.

Accordingly, the inorganic portion 231a according to an embodiment of the present disclosure can be disposed in a form in which a rectangular parallelepiped-shaped stripe patterns are spaced apart from each other.

For example, the inorganic portion 231a of the vibration portion 231 can include a lead zirconate titanate (PZT)-based material including lead (Pb), zirconium (Zr), and titanium (Ti), or lead zirconate nickel niobate (PZNN)-based material including lead (Pb), zinc (Zn), nickel (Ni), and niobium (Nb), but embodiments of the present disclosure are not limited thereto. As another example, the inorganic portion 231a can include at least one of $CaTiO_3$, $BaTiO_3$, and $SrTiO_3$ without lead (Pb), but embodiments of the present disclosure are not limited thereto.

The organic portion 231b of the vibration portion 231 can include a first organic portion 231b1 disposed adjacent to the inorganic portion 231a, and a second organic portion 231b2 disposed between adjacent first organic portions 231b1.

The first organic portion 231b1 and the second organic portion 231b2 can have predetermined widths Wb1 and Wb2 in the first direction X, respectively, like the inorganic portion 231a described above, and can have a predetermined length in the second direction Y intersecting the first direction X. For example, the length of the first organic portion 231b1 and the second organic portion 231b2 in the second direction Y can correspond to the length of the inorganic portion 231a. Also, the first organic portion 231b1 and the second organic portion 231b2 can be adjusted to have a predetermined thickness in the third direction Z. For example, the thickness of the first organic portion 231b1 and the second organic portion 231b2 in the third direction Z can be the same as that of the inorganic portion 231a.

For example, the sum of widths Wb1 and Wb2 of the first organic portion 231b1 and the second organic portion 231b2 in the first direction X can be adjusted to 10 to 100 µm, or 30 to 70 µm, or 55 µm.

Accordingly, each of the first organic portion 231b1 and the second organic portion 231b2 can be provided in a rectangular parallelepiped stripe pattern, and the second organic portion 231b2 can be provided in a sandwiched form between any one of the first organic portions 231b1 and the other first organic portion 231b1.

Also, as illustrated in FIG. 4, the organic portion 231b between two adjacent inorganic portions 231a can include a pair of first organic portions 231b1 and one second organic portion 231b2 disposed therebetween.

The vibration portion 231 according to an embodiment of the present disclosure has a structure in which the organic portions 231b including the first organic portion 231b1 and the second organic portion 231b2 having the same length as that of the plurality of long stripe-shaped inorganic portions 231a in the second direction are alternately arranged, the vibration generator 230 according to an embodiment of the present disclosure can be a 2-2 type piezoelectric composite structure.

According to an embodiment of the present disclosure, an elastic modulus or Young's modulus of the first organic portion 231b1 can have a value lower than an elastic modulus or Young's modulus of the second organic portion 231b1.

For example, the first organic portion 231b1 of the vibration portion 231 can be one or more of an acryl-based polymer and a silicone-based polymer, but embodiments of the present disclosure are not limited thereto. The first organic portion 231b1 of the vibration portion 231 can have an elastic modulus less than 0.1 GPa (giga pascals), and can be formed of, for example, a silicone-based polymer having a value of about 0.0015 GPa.

For example, the second organic portion 231b2 of the vibration portion 231 can be an epoxy-based polymer, but embodiments of the present disclosure are not limited thereto. The second organic portion 231b2 of the vibration portion 231 can have an elastic modulus of 2 GPa or more, for example, when the second organic portion 231b2 of the vibration portion 231 is formed of an epoxy-based polymer, it can have a value of elastic modulus of about 2.0 GPa.

Also, a total elastic modulus of the organic portions 231b1 and 231b2 can be changed according to a ratio of the widths of the first organic portion 231b1 and the second organic portion 231b2. For example, when the first organic portion 231b1 is formed of a silicone-based polymer and the second organic portion 231b2 is formed of an epoxy-based polymer, a total elastic modulus of the organic portions 231b1 and 231b2 can be obtained as shown in Table 1 below.

TABLE 1

| Ratio of first organic portion and second organic portion in first direction | Elastic modulus of first organic portion | Elastic modulus of second organic portion | Total elastic modulus |
|---|---|---|---|
| Single layer | 0.0015 GPa | 2.0 GPa | — |
| 0.4:0.6 | — | — | 1.2 GPa |
| 0.5:0.5 | — | — | 1.0 GPa |
| 0.6:0.4 | — | — | 0.8 GPa |

TABLE 1-continued

| Ratio of first organic portion and second organic portion in first direction | Elastic modulus of first organic portion | Elastic modulus of second organic portion | Total elastic modulus |
|---|---|---|---|
| 0.7:0.3 | — | — | 0.6 GPa |
| 0.8:0.2 | — | — | 0.4 GPa |

According to an embodiment of the present disclosure, in order to implement a vibration displacement of about 5 µm of the inorganic portion 231a when configuring the vibration portion 231b, a ratio of the width Wb1 of the first organic portion 231b1 to the total sum of the widths of the first organic portion 231b1 and the second organic portion 231b2 in the first direction X can be 40% or more and a ratio of the width Wb2 of the second organic portion 231b2 to the total sum of the widths of the first organic portion 231b1 and the second organic portion 231b2 in the first direction X can be 60% or less.

Accordingly, the first organic portion 231b1 can account for 40% to 80% with respect to the organic portion 231b, and the second organic portion 231b2 can account for 20% to 60% with respect to the organic portion 231b. Also, the first organic portion 231b1 can account for 50% to 60% with respect to the organic portion 231b, and the second organic portion 231b2 can account for 30% to 40% with respect to the organic portion 231b. Further, the first organic portion 231b1 can account for 60% with respect to the organic portion 231b, and the second organic portion 231b2 can account for 40% with respect to the organic portion 231b.

The first electrode portion 233 can be disposed on the first surface (or upper surface) of the vibration portion 231. The first electrode portion 233 can be commonly disposed or coupled to the first surface of each of the inorganic portions 231a and the first surface of each of the plurality of first organic portions 231b1 and the second organic portion 231b2. The first electrode portion 233 can be electrically connected to each of the first surfaces. For example, the first electrode portion 233 can be disposed on the entire first surface of the vibration portion 231 (e.g., in the form of a rectangular sheet or plate type structure). Also, first electrode portion 233 can have a cylindrical electrode shape. For example, the first electrode portion 233 can have substantially the same shape as the vibration portion 231, but embodiments of the present disclosure are not limited thereto. The first electrode portion 233 according to an embodiment of the present disclosure can be formed of a transparent conductive material, a semi-transparent conductive material, or an opaque conductive material, but embodiments of the present disclosure are not limited thereto.

The second electrode portion 235 can be disposed on a second surface (or lower surface) opposite to or different from the first surface of the vibration portion 231. The second electrode portion 235 can be commonly disposed on or coupled to the second surface of each of the plurality of inorganic portions 231a and the second surface of each of the plurality of organic portions 231b. The second electrode portion 235 can be electrically connected to the second surface of each of the plurality of inorganic portions 231a. For example, the second electrode portion 235 can be disposed on the entire second surface of the vibration portion 231 (e.g., in the form of a rectangular sheet or plate type structure). Also, second electrode portion 235 can have a cylindrical electrode shape. For example, the second electrode portion 235 can have the same shape as the vibration portion 231, but embodiments of the present disclosure are not limited thereto. The second electrode portion 235 according to an embodiment of the present disclosure can be formed of a transparent conductive material, a semi-transparent conductive material, or an opaque conductive material, but embodiments of the present disclosure are not limited thereto.

The first electrode portion 233 can be covered by a first protective member 220 to be described later. The second electrode portion 235 can be covered by a second protective member 240 to be described later.

The first protective member 220 can be disposed on the first electrode portion 233, and the first protective member 220 can protect the first electrode portion 233. The second protective member 240 can be disposed on the second electrode portion 235, and the second protective member 240 can protect the second electrode portion 235. For example, each of the first protective member 220 and the second protective member 240 of the vibration generator 230 can be formed of a plastic material or a fiber material, but embodiments of the present disclosure are not limited thereto. For example, in the vibration generator 230, the first protective member 220 can be formed of the same material as or different from that of the second protective member 240. At least one of the first protective member 220 and the second protective member 240 of the vibration generator 230 can be connected to or coupled to the rear surface of the display panel 100 via a connection member 150. For example, the first protective member 220 of the vibration generator 230 can be connected to or coupled to the rear surface of the display panel 100 via the connection member 150.

The first protective member 220 can include a base member 221 and an adhesive layer 223, and the adhesive layer 223 can be formed to be adjacent to the vibration generator 230 rather than the base member 221. The adhesive layer 223 of the first protective member 220 can be disposed between the first electrode portion 233 of the vibration generator 230 and the base member 221 of the first protective member 220.

The second protective member 240 can include a base member 244 and an adhesive layer 243, and the adhesive layer 243 can be formed to be adjacent to the vibration generator 230 rather than the base member 244. The adhesive layer 243 of the second protective member 240 can be disposed between the second electrode portion 235 of the vibration generator 230 and the base member 244 of the first protective member 240.

Each of the base members 221 and 244 of the first and second protective members 220 and 240 can be formed of a polyimide film or a polyethylene terephthalate film, but embodiments of the present disclosure are not limited thereto.

Each of the adhesive layers 223 and 243 of the first and second protective members 220 and 240 can include an epoxy-based polymer, an acryl-based polymer, a silicone-based polymer, or urethane-based polymer, but embodiments of the present disclosure are not limited thereto.

The adhesive layer 223 of the first protective member 220 and the adhesive layer 243 of the second protective member 240 can be connected or coupled to each other between the first protective member 220 and the second protective member 240. For example, the adhesive layer 223 of the first protective member 220 and the adhesive layer 243 of the second protective member 240 can be connected or coupled to each other at an edge portion between the first protective member 220 and the second protective member 240. Accordingly, the vibration portion 231 of the vibration generator 230 can be surrounded by the adhesive layer 223 of the first protective member 220 and the adhesive layer 243 of the second protective member 240. For example, the adhesive layer 223 of the first protective member 220 and the adhesive layer 243 of the second protective member 240 can completely surround the vibration portion 231 of the vibration generator 230. For example, the adhesive layer 223 of the first protective member 220 and the adhesive layer 243 of the second protective member 240 can be expressed as a cover member, and the like, but embodiments of the present disclosure are not limited thereto. When the adhesive layer 223 of the first protective member 220 and the adhesive layer 243 of the second protective member 240 are cover members, the first protective member 220 can be disposed on the first surface of the cover member and the second protective member 240 can be disposed on the second surface of the cover member. For example, the vibration generator can be fully sealed between the first protective member 220 and the second protective member 240.

FIGS. 5A to 5D illustrate a method of manufacturing a vibration portion according to an embodiment of the present disclosure.

With reference to FIGS. 5A to 5D, the vibration portion according to an embodiment of the present disclosure can be prepared in the following manner.

Figure 5A:
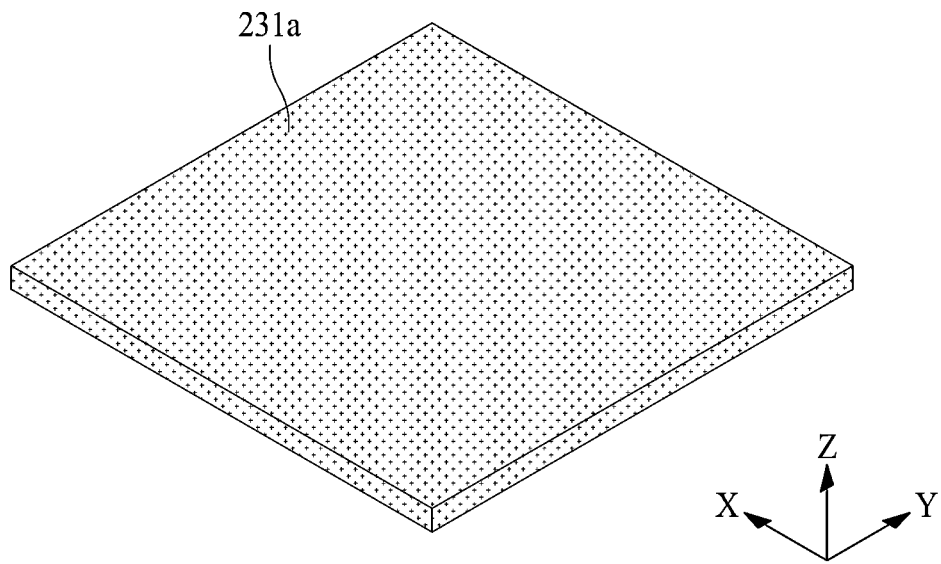
FIGS. 5A to 5D illustrate a method of manufacturing a vibration portion according to an embodiment of the present disclosure.

First, as illustrated in FIG. 5A, an inorganic portion 231a having a predetermined dimension is prepared. For example, the inorganic portion 231a can have a width of 8 mm in the first direction X, a length of 10 mm in the second direction Y, and a thickness of 50 μm in the third direction Z.

Figure 5B:
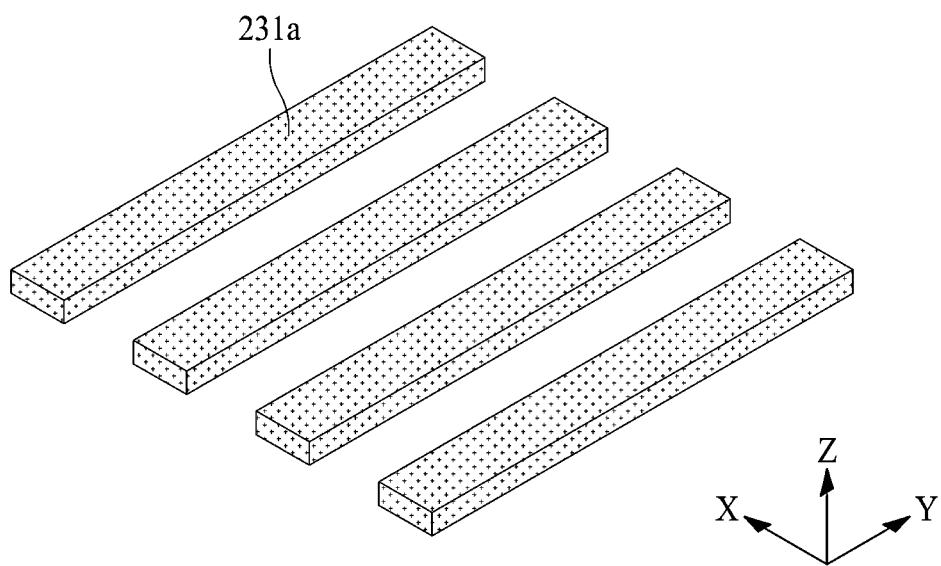

Next, as shown in FIG. 5B, the inorganic portion 231a is cut to have a predetermined width in the first direction X and a predetermined length in the second direction Y to prepare a plurality of stripe patterns spaced apart from each other. For example, the width in the first direction X of each stripe pattern can be 2,500 μm, but is not limited thereto.

Figure 5C:
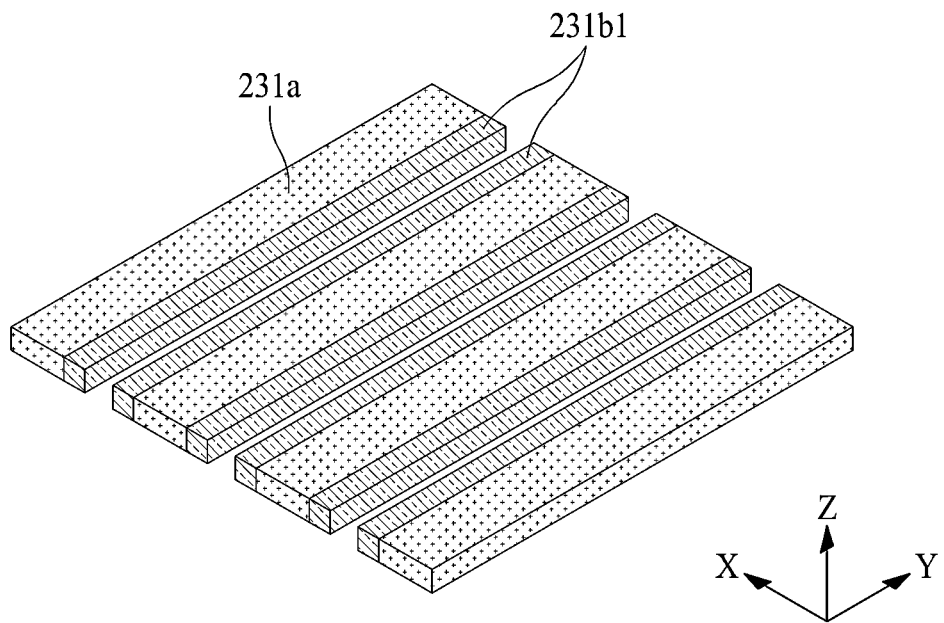

Next, as shown in FIG. 5C, a first organic portion 231b1 is disposed on a side surface where the plurality of separated inorganic portions 231a face each other. For example, the first organic portion 231b1 can have a predetermined width in the first direction X and a predetermined length in the second direction Y, and the length of the first organic portion 231b1 in the second direction Y can correspond to the length of the inorganic portion 231a. For example, the width of the first organic portion 231b1 in the first direction X can be 20 μm.

Figure 5D:
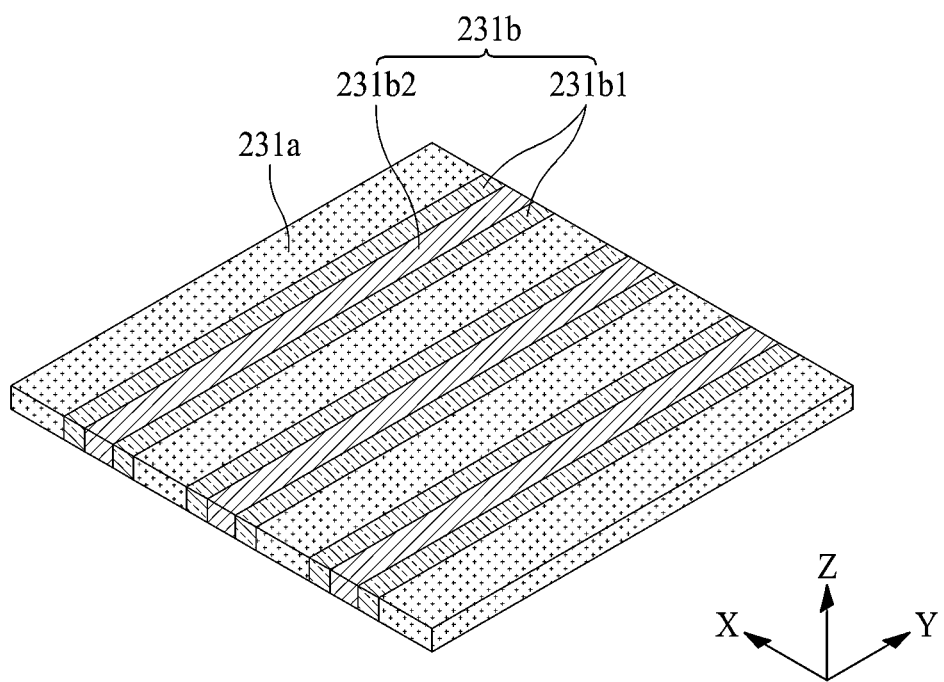

Next, as shown in FIG. 5D, a second organic portion 231b2 is disposed between the first organic portions 231b1 located on an inner side of the inorganic portion 231a. For example, the second organic portion 231b2 can have a predetermined width in the first direction X and a predetermined length in the second direction Y, and the length thereof in the second direction Y can be a size corresponding to the length of the inorganic portion 231a. For example, the width of the second organic portion 231b2 in the first direction X can be 60 μm.

FIGS. 6A to 6E illustrate a method of manufacturing a vibration portion according to another embodiment of the present disclosure.

Figure 6A:
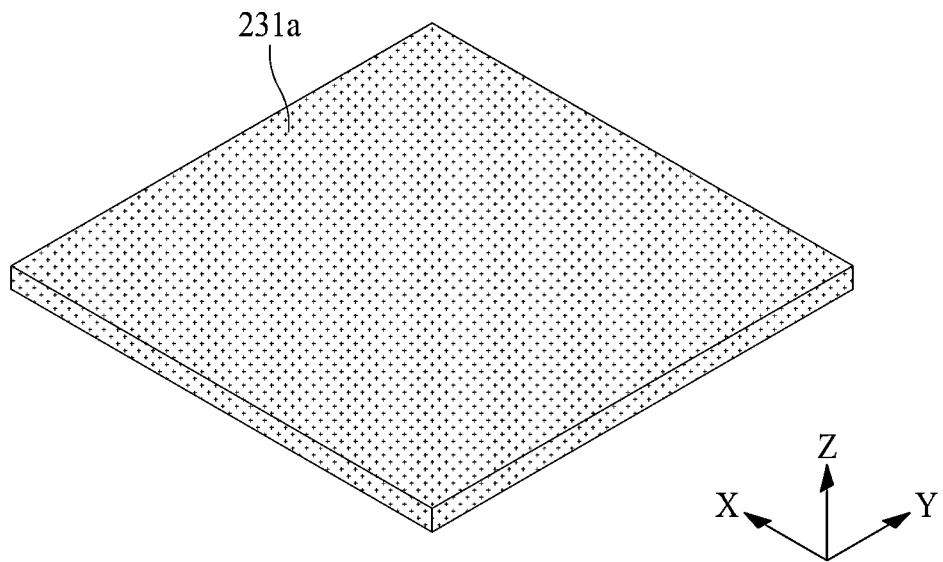
FIGS. 6A to 6E illustrate a method of manufacturing a vibration portion according to another embodiment of the present disclosure.
Figure 6B:
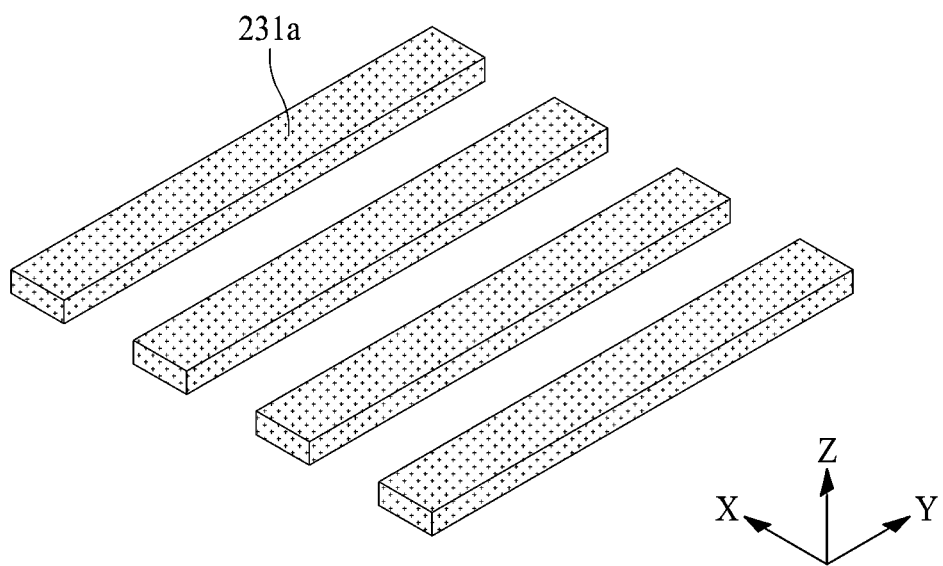

First, as illustrated in FIGS. 6A and 6B, an inorganic portion 231a having a predetermined size is prepared and cut to be spaced apart from each other. FIGS. 6A and 6B are the same as FIGS. 5A and 5B described above, and thus repeated descriptions are omitted or may be briefly provided.

Figure 6C:
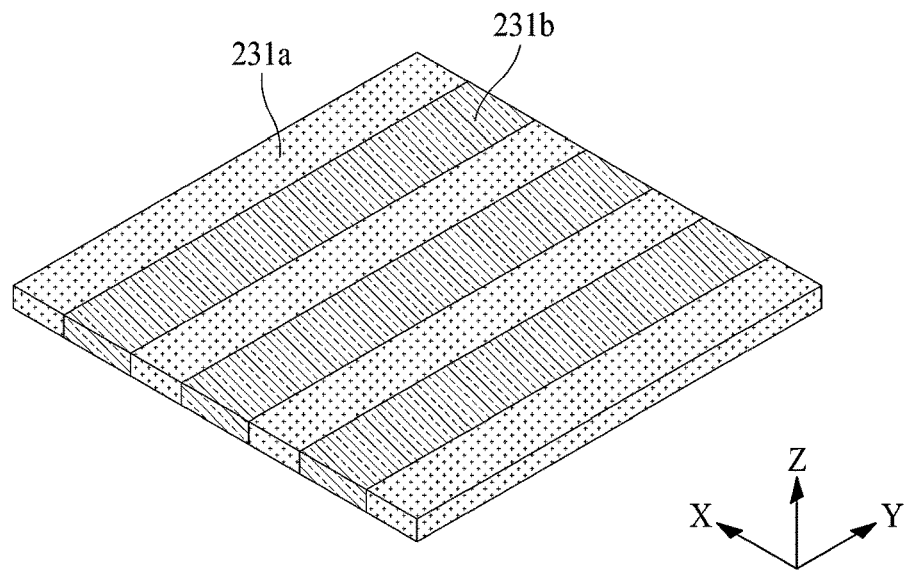

Next, as shown in FIG. 6C, the organic portion 231b is disposed on a side surface in which the plurality of separated inorganic portions 231a face each other, and empty spaces between the plurality of separated inorganic portions 231a are filled. For example, the organic portion 231b can have a predetermined width in the first direction X, a predetermined length in the second direction Y, and the length thereof in the second direction Y can be a size corresponding to the length of the inorganic portion 231a. For example, the width of the organic portion 231b in the first direction X can be 100 μm.

Figure 6D:
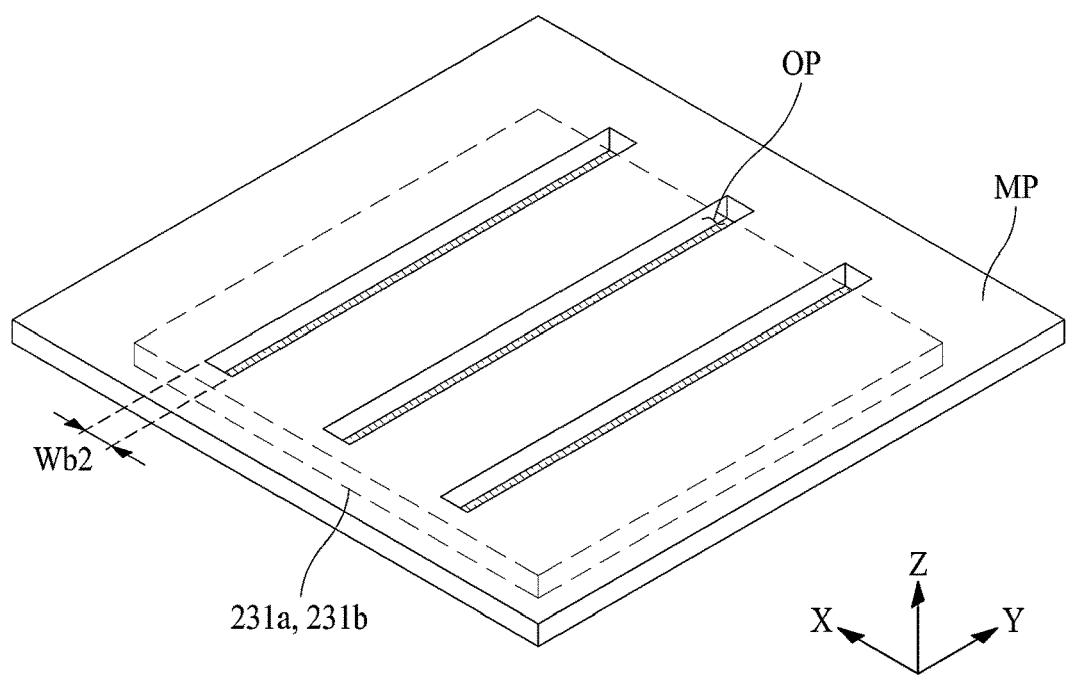

Next, as shown in FIG. 6D, a mask pattern MP having an opening portion OP is disposed on the inorganic portions 231a and the organic portions 231b. A width of the opening portion OP of the mask pattern MP in the first direction X can correspond to the width of the second organic portion 231b2 described above.

Accordingly, the width Wb2 of the opening portion OP of the mask pattern MP of FIG. 6D in the first direction can be adjusted to 20% to 60% of a total length of the organic portion 231b in the first direction X. Also, the width Wb2 of the opening portion OP of the mask pattern MP of FIG. 6D in the first direction can be adjusted to 30% to 50% of a total length of the organic portion 231b in the first direction X, or can be adjusted to 40% of a total length of the organic portion 231b in the first direction X.

When the mask pattern MP having the opening portion OP is used, a heat source or an energy source can be irradiated only to a preset area corresponding to the second organic portion 231b2, and the organic portion 231b can be thermally cured or UV-cured to prepare the second organic portion 231b2, and the structure of the organic portion 231b including the first organic portion 231b1 or the second organic portion 231b2 inserted into or accommodated between the first organic portions 231b1 and having an elastic modulus higher than that of the first organic portion 231b1 can be prepared. For example, the heat source irradiated through the opening portion OP of the mask pattern MP can be UV rays, and the agent of the organic portion 231b irradiated with UV can be cured by UV curing to increase the elastic modulus.

For example, when the organic portion 231b is thermally cured at a temperature of 150° C. by UV irradiation through the opening portion OP in FIG. 6D, the strength or elastic modulus of the first organic portion 231b1 can increase by about 20%.

Figure 6E:
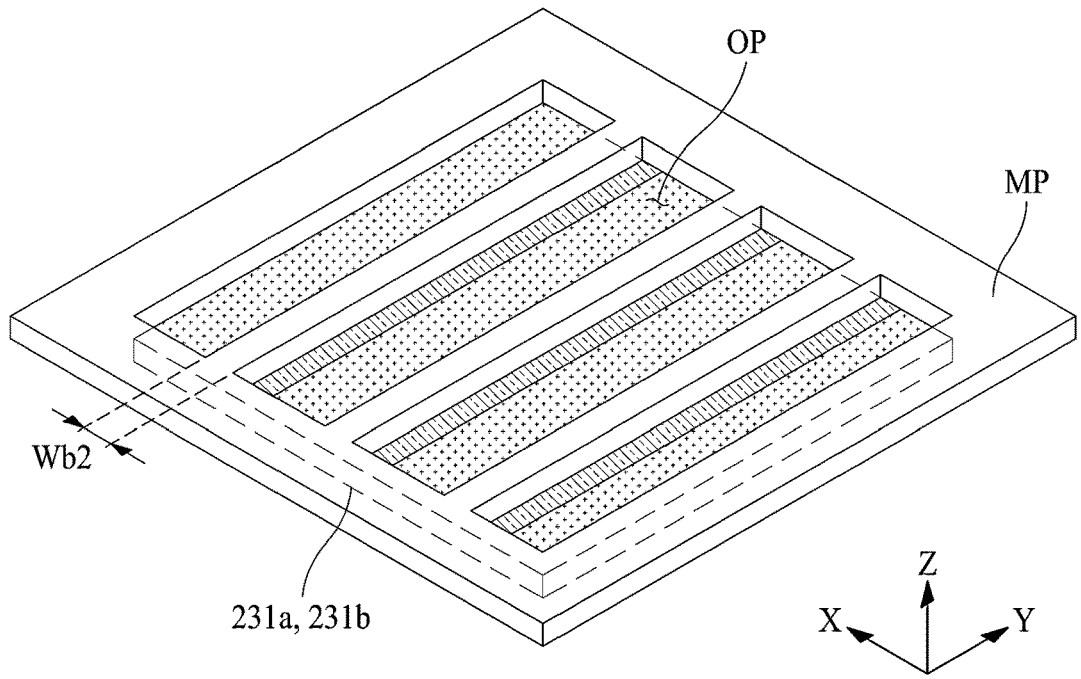

Next, FIG. 6E illustrates according to another embodiment of the present disclosure in which the second organic portion 231b2 and the first organic portion 231b1 separated from the second organic portion 231b2 are formed by curing a part of the organic portion 231b shown in FIG. 6D. In FIG. 6E, the opening portion OP of the mask pattern MP can overlap only an area excluding the area corresponding to the preset second organic portion 231b2. The mask pattern MP between the opening portions OPs can be set to directly contact the region where the preset second organic portion 231b2 is formed. Accordingly, the region corresponding to the second organic portion 231b2 between the openings OP of the mask pattern MP of FIG. 6E can be adjusted to 20% to 60% of the total length in the first direction X, or can be adjusted to 30% to 50% of the total length in the first direction X, or 40% of the total length in the first direction X.

The mask pattern MP can be a mask pattern MP formed of a material having high thermal conductivity. The first organic portion 231b1 can be thermally cured by locally increasing a temperature of the region corresponding to the second organic portion 231b2 by increasing the temperature of the mask pattern MP to prepare the structure of the organic portion 231b including the first organic portion 231b1 and the second organic portion 231b2 between the first organic portions 231b1 and having an elastic modulus higher than that of the first organic portion 231b1.

Figure 7:
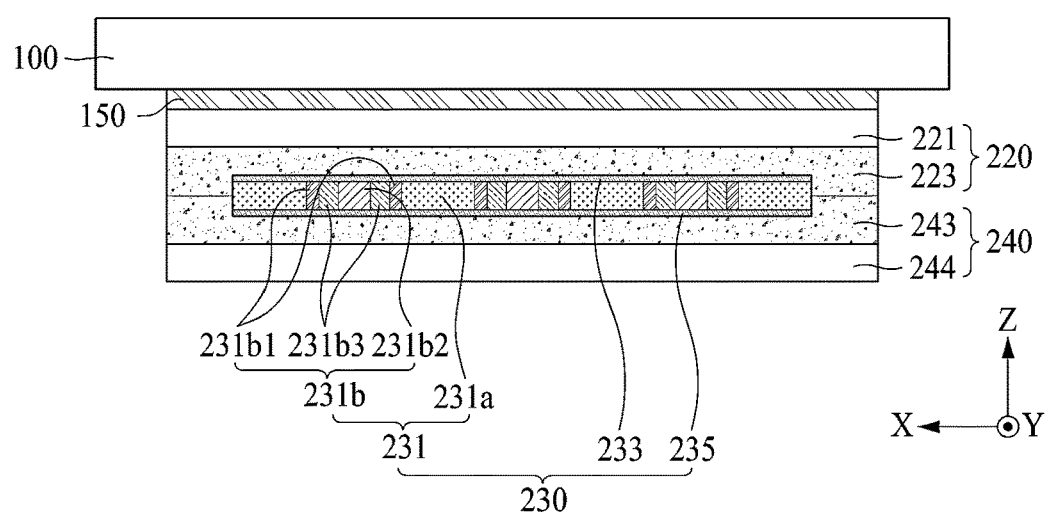
FIG. 7 is a cross-sectional view illustrating a vibration device connected to a display panel according to another embodiment of the present disclosure.
Figure 8:
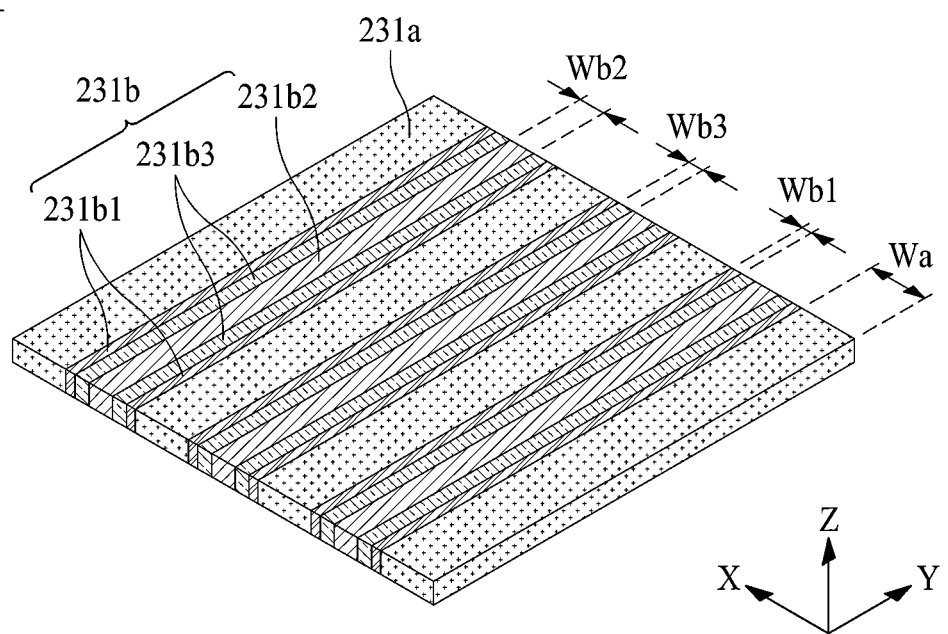
FIG. 8 is a perspective view of a vibration portion according to another embodiment of the present disclosure.

FIG. 7 is a cross-sectional view illustrating a vibration device connected to a display panel according to another embodiment of the present disclosure, and FIG. 8 is a perspective view of a vibration portion according to another embodiment of the present disclosure. In FIGS. 7 and 8, a configuration of the display apparatus is the same as that of the display apparatus of FIGS. 3 and 4, except that the structure of the vibration portion 231 of the vibration generator 230 is changed, and thus, repeated descriptions are omitted or may be briefly provided.

With reference to FIGS. 7 and 8, the vibration portion 231 according to another embodiment of the present disclosure can include an inorganic portion 231a including a piezoelectric material and an organic portion 231b including a polymer material. The vibration portion 231 can include the first organic portion 231b1, the second organic portion 231b2, and the third organic portion 231b3 filled between the plurality of stripe-shaped inorganic portions 231a spaced apart from each other.

For example, the inorganic portion 231a can be provided to be spaced apart from each other by a predetermined distance, and for example, the inorganic portion 231a can have a predetermined width Wa in the first direction X and can have a predetermined length in the second direction Y intersecting the first direction X. Also, the inorganic portion 231a can be adjusted to have a predetermined thickness in the third direction Z.

For example, the width Wa of the inorganic portion 231a in the first direction X can be adjusted to 1 to 2 mm or approximately 1.5 mm, and the length of the inorganic portion 231a in the second direction Y can be variably changed according to a position attached to the rear surface of the display panel 100. In addition, the length or thickness of the inorganic portion 231a in the third direction Z perpendicular to the first direction X and the second direction Y can be adjusted to 100 μm to 500 μm, or can be adjusted to 200 μm to 400 μm, or 300 μm.

Accordingly, the inorganic portion 231a according to an embodiment of the present disclosure can be disposed in a form in which a rectangular parallelepiped-shaped stripe patterns are spaced apart from each other.

For example, the inorganic portion 231a of the vibration portion 231 can include a lead zirconate titanate (PZT)-based material including lead (Pb), zirconium (Zr), and titanium (Ti) or a lead zirconate nickel niobate (PZNN)-based material including lead (Pb).), zinc (Zn), nickel (Ni), and niobium (Nb), but embodiments of the present disclosure are not limited thereto. As another example, the inorganic portion 231a can include at least one of $CaTiO_3$, $BaTiO_3$, and $SrTiO_3$ without lead (Pb), but embodiments of the present disclosure are not limited thereto.

The organic portion 231b of the vibration portion 231 can include a first organic portion 231b1 disposed adjacent to the inorganic portion 231a, a third organic portion 231b3 disposed adjacent to the first organic portions 231b1, and a second organic portion 231b2 between the third organic portions 231b3.

The first organic portion 231b1, the second organic portion 231b2, and the third organic portion 231b3 can have predetermined widths Wb1, Wb2, and Wb3 in the first direction X, respectively, like the aforementioned inorganic portion 231a, respectively, and can have a predetermined length in the second direction Y intersecting the first direction X. The length of the first organic portion 231b1, the second organic portion 231b2, and the third organic portion 231b3 in the second direction Y can correspond to the length of the inorganic portion 231a. Also, the first organic portion 231b1, the second organic portion 231b2, and the third organic portion 231b3 can be adjusted to have a predetermined thickness in the third direction. For example, the thickness of the first organic portion 231b1, the second organic portion 231b2, and the third organic portion 231b3 in the third direction Z can be the same as that of the inorganic portion 231a.

For example, the sum of the widths of the first organic portion 231b1, the second organic portion 231b2, and the third organic portion 231b3 in the first direction X can be adjusted to 10 to 100 μm. Also, the sum of the widths of the first organic portion 231b1, the second organic portion 231b2, and the third organic portion 231b3 in the first direction X can be adjusted to 30 to 70 μm, or 55 μm.

Accordingly, each of the first organic portion 231b1, the second organic portion 231b2, and the third organic portion 231b3 can be provided in a rectangular parallelepiped-shaped stripe pattern.

The first organic portion 231b1 can be disposed to contact a side surface of the inorganic portion 231a, the third organic portion 231b3 can be disposed to contact the exposed side surface of the first organic portion 231b1, the second organic portion 231b2 can be provided in a sandwiched form between any one of the third organic portions 231b3 and another third organic portion 231b3. Accordingly, the first organic portion 231b1, the second organic portion 231b2, and the third organic portion 231b3 can be arranged to fill the space between the plurality of inorganic portions 231a.

Also, as illustrated in FIG. 8, the organic portion 231b inserted between two adjacent inorganic portions 231a can include a pair of first organic portions 231b1, a pair of third organic portions 231a, and one second organic portion 231b2. For example, the organic portion 231b can have five layers stacked in the X direction.

Accordingly, the vibration portion 231 according to an embodiment of the present disclosure is configured to have a structure in which the organic portions 231b including the first organic portion 231b1, the second organic portion 231b2, and the third organic portion 231b3 having the same length in the second direction as that of the plurality of long stripe-shaped inorganic portions 231a, and thus, the vibration generator 230 according to an embodiment of the present disclosure can be a 2-2 type piezoelectric composite structure.

According to an embodiment of the present disclosure, an elastic modulus or Young's modulus of the first organic portion 231b1 can have a value lower than the elastic modulus or Young's modulus of the third organic portion 231b3, an elastic modulus or Young's modulus of the third organic portion 231b3 can have a value lower than an elastic modulus or Young's modulus of the second organic portion 231b2.

For example, the organic portion 231b can be adjusted to increase the elastic modulus in the order of the first organic portion 231b1, the third organic portion 231b3, and the second organic portion 231b2.

For example, the first organic portion 231b1 of the vibration portion 231 can be one or more of an acryl-based polymer and a silicone-based polymer, but embodiments of the present disclosure are not limited thereto. The first organic portion 231b1 of the vibration portion 231 can have an elastic modulus less than 0.1 GPa. For example, when the first organic portion 231b1 is formed of a silicone-based polymer, it can have a value of about 0.0015 GPa.

For example, the third organic portion 231b3 of the vibration portion 231 can be one or more of a silicone-based polymer, an acrylic-based polymer, a urethane-based polymer, and an epoxy-based polymer, but embodiments of the present disclosure are not limited thereto. The third organic portion 231b3 of the vibration portion 231 can have an elastic modulus of 0.1 GPa or more and less than 2.0 GPa. The elastic modulus of the third organic portion 231b3 can be adjusted to be in the range of 0.1 GPa or more to less than 2.0 GPa by adjusting a cross-linking density during curing of the third organic portion 231b3.

For example, the second organic portion 231b2 of the vibration portion 231 can be an epoxy-based polymer, but embodiments of the present disclosure are not limited thereto. The second organic portion 231b2 of the vibration portion 231 can have an elastic modulus of 2.0 GPa or more. For example, when the second organic portion 231b2 is formed of an epoxy-based polymer, it can have a value of about 2.0 GPa.

Also, a total elastic modulus of the organic portions 231b1 and 231b2 can be changed according to a ratio of the widths of the first organic portion 231b1 and the second organic portion 231b2. For example, when the first organic portion 231b1 is formed of a silicone-based polymer and the second organic portion 231b2 is formed of an epoxy-based polymer, a total elastic modulus of the organic portions 231b1 and 231b2 can be obtained as shown in Table 2 below.

TABLE 2

| Ratio of first organic portion and second organic portion in first direction | Elastic modulus of first organic portion | Elastic modulus of second organic portion | Elastic modulus of third organic portion | Total elastic modulus |
| --- | --- | --- | --- | --- |
| Single layer | 0.0015 GPa | 1.0 GPa | 2.0 GPa | — |
| 0.2:0.2:0.6 | | | | 1.4 GPa |
| 0.2:0.4:0.4 | | | | 1.2 GPa |
| 0.2:0.6:0.2 | | | | 1.0 GPa |

According to an embodiment of the present disclosure, in order to implement a vibration displacement of about 5 μm of the inorganic portion 231a when configuring the vibration portion 231b, a ratio of the width Wb1 of the first organic portion 231b1 and the width Wb3 of the third organic portion 231b3 to the total sum of the widths of the first organic portion 231b1, the second organic portion 231b2, and the third organic portion 231b3 in the first direction X can be 40% or more and a ratio of the width Wb2 of the second organic portion 231b2 to the total sum of the widths of the first organic portion 231b1, the second organic portion 231b2, and the third organic portion 231b3 in the first direction X can be 60% or less.

Accordingly, the first organic portion 231b1 and the third organic portion 231b3 can account for 40% to 80% of the organic portion 231b, and the second organic portion 231b2 can account for 20% to 60% with respect to the organic portion 231b.

According to an embodiment of the present disclosure, in configuring the vibration portion 231, when the organic portion 231b inserted between two adjacent inorganic portions 231a includes a pair of first organic portions 231b1, a pair of third organic portions 231b3, and one second organic portion 231b2 to implement a vibration displacement of the 5 μm level of the inorganic portion 231a, the third organic portion 231b3 having a medium elastic modulus is additionally included, compared with the structure of the vibration portion 231 of FIG. 4, whereby the organic portion 231b can increase the total elastic modulus of the organic portion 231b, while satisfying a displacement amount of the inorganic portion 231a. Accordingly, since the vibration portion 231 according to another embodiment of the present disclosure includes the inorganic portion 231a and the organic portion 231b including the first organic portion 231b1, the second organic portion 231b2, and the third organic portion 231b3, it can have improved sound pressure level characteristics, compared with the vibration portion 231 of FIGS. 3 and 4 including the inorganic portion 231a and the organic portion 231b including the first organic portion 231b1 and the second organic portion 231b2.

Figure 9A:
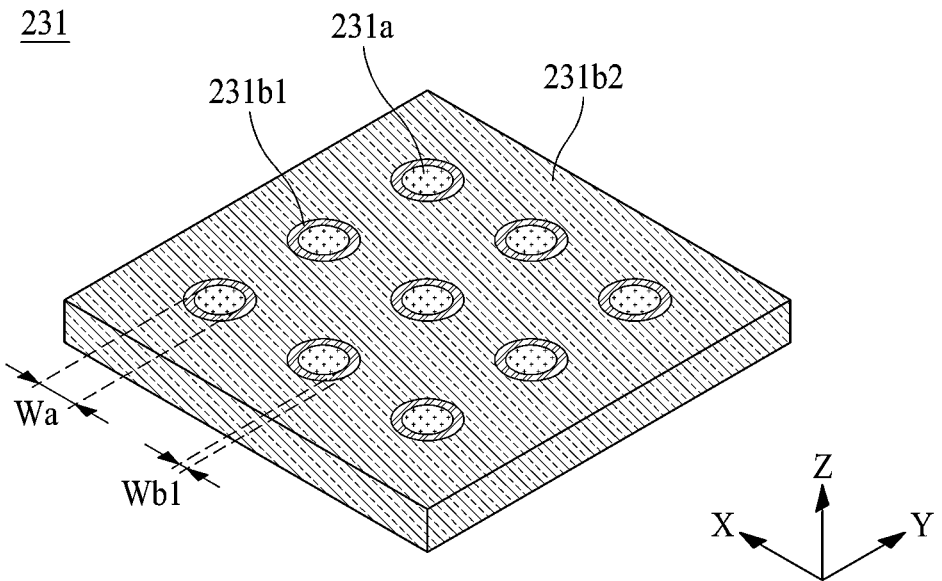
FIGS. 9A and 9B are perspective views of a vibration portion according to another embodiment of the present disclosure.
Figure 9B:
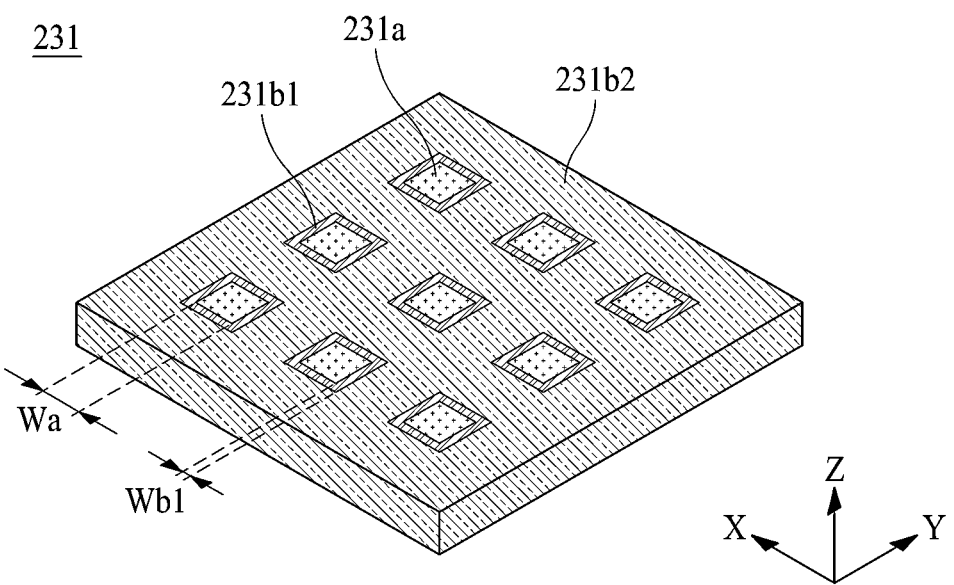

FIGS. 9A and 9B are perspective views of a vibration portion according to another embodiment of the present disclosure.

With reference to FIGS. 9A and 9B, the vibration portion 231 can include an inorganic portion 231a including a piezoelectric material and an organic portion 231b including a polymer material. For example, the vibration portion 231 can be provided in a form in which circular or rectangular linear columns are inserted using the organic portion 231b as a matrix or a grid arrangement. The first organic portion 231b1 can be disposed to directly contact and surround the plurality of inorganic portions 231a, and the second organic portion 231b2 can be disposed to surround the outside of the first organic portion 231b1. The vibration generator 230 including the vibration portion 231 according to another embodiment of the present disclosure shown in FIGS. 9A and 9B can have a 1-3 type piezoelectric composite structure.

As illustrated in FIG. 9A, when the inorganic portion 231a is prepared in a cylindrical shape having a circular or elliptical base, a diameter Wa of the base of the inorganic portion 231a can be set to 1 to 2 mm, or 1.5 mm. In addition, as shown in FIG. 9B, when the inorganic portion 231a is prepared in the form of a square column having a square or rectangular base, the length or width Wa of any one side of the inorganic portion 231a can be adjusted to 1 to 2 mm, or 1.5 mm.

Next, in order to realize vibration displacement of the inorganic portion 231a to the maximum, the width Wb1 or the thickness Wb1 of the first organic portion 231b1 surrounding the inorganic portion 231a can be within a range of 1 to 100 μm and can be, for example, a thickness of 5 μm. When the thickness Wb1 of the first organic portion 231b1 surrounding the inorganic portion 231a is adjusted in the range of 1 to 100 μm, the vibration displacement of the inorganic portion 231a can be maximally secured. If the thickness Wb1 of the first organic portion 231b1 surrounding the inorganic portion 231a is less than 1 μm, sufficient vibration displacement of the inorganic portion 231a may not be secured. If the thickness Wb1 of the first organic portion 231b1 surrounding the inorganic portion 231a exceeds 100 μm, the proportion of the second organic portion 231b2 in the vibrating portion 231 can be reduced to lower a total elastic modulus of the organic portion 231b, and thus, sound pressure level characteristics of the vibration generator 230 including the vibration portion 231 can be reduced.

Figure 10:
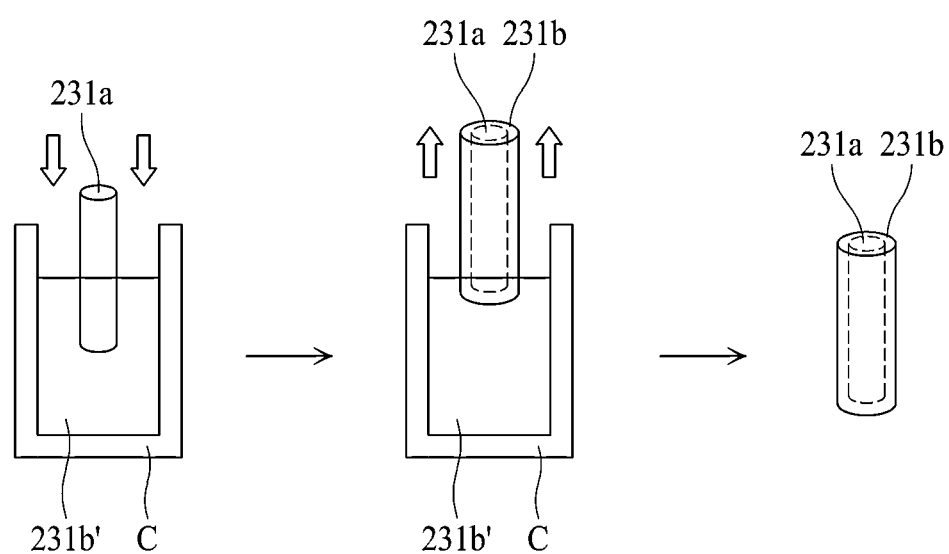
FIG. 10 illustrates a method of manufacturing the vibration portion of FIGS. 9A and 9B according to an embodiment of the present disclosure.

FIG. 10 illustrates a method of manufacturing the vibration portion of FIGS. 9A and 9B.

With reference to FIG. 10, the vibration portion of FIGS. 9A and 9B can be manufactured by a dip coating method. For example, a first organic portion melt solution 231b' prepared by melting the same material as the first organic portion 231b is prepared in the container C, and the inorganic portion 231a can be immersed therein so that the surface of the inorganic portion 231a can be coated. For example, since the organic portion 231b formed or coated on the inorganic portion 231a is not in a cured state, it can be a wet layer. Subsequently, the wet layer is cured by applying a heat source, and the material of the first organic portion 231b1 is crosslinked to have a predetermined elastic modulus.

Figure 11A:
FIGS. 11A and 11B are photographs of vibration portion according to an Experimental Example and an embodiment of the present disclosure, taken by a scanning electron microscope.
Figure 11B:
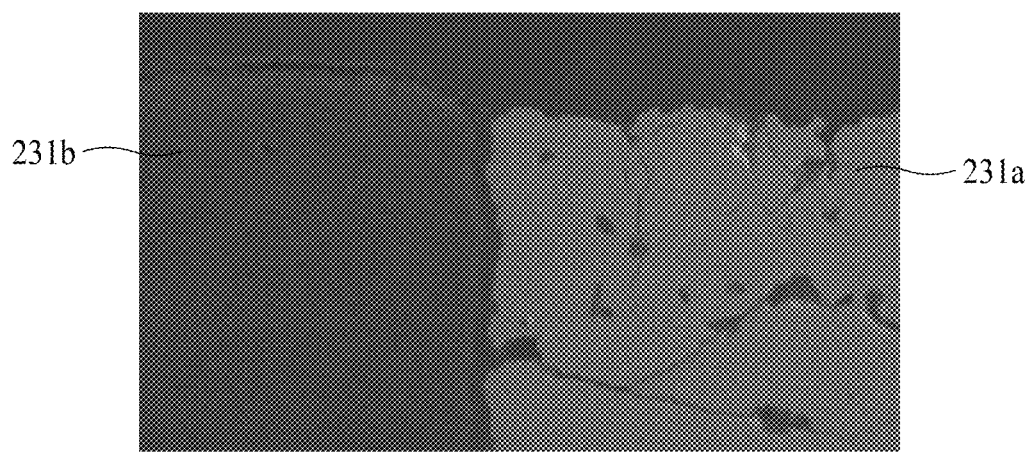

FIGS. 11A and 11B are photographs of vibration portions according to an Experimental Example and an embodiment the present disclosure, taken by a scanning electron microscope.

Particularly, FIG. 11A is a photograph taken after configuring a vibration portion 231 by arranging the first organic portion 231b1 formed of a silicone-based polymer having a low elastic modulus adjacent to the inorganic portion 231a and driving the vibration portion 231. FIG. 11B is a photograph taken after configuring the vibration portion 231 by arranging the second organic portion 231b2 formed of an epoxy-based polymer having a high elastic modulus adjacent to the inorganic portion 231a and driving the vibration portion 231.

With reference to FIGS. 11A and 11B, in the situation of the vibration portion 231 prepared by FIG. 11A, when the silicone-based polymer having a relatively low elastic modulus is disposed as a filler or a cushioning material for the vibration of the inorganic portion 231a, an excellent buffering action can be provided in a contact surface between the inorganic portion 231a and the first organic portion 231b, thereby preventing cracks from occurring during driving of the inorganic portion 231a. In the situation of the vibration portion 231 prepared by FIG. 11B, when the epoxy-based polymer having a high elastic modulus is disposed as a filler or a cushioning material for vibration of the inorganic portion 231a, a buffer action is not large due to the high elastic modulus, so that cracks occur in the inorganic portion 231a.

Figure 12A:
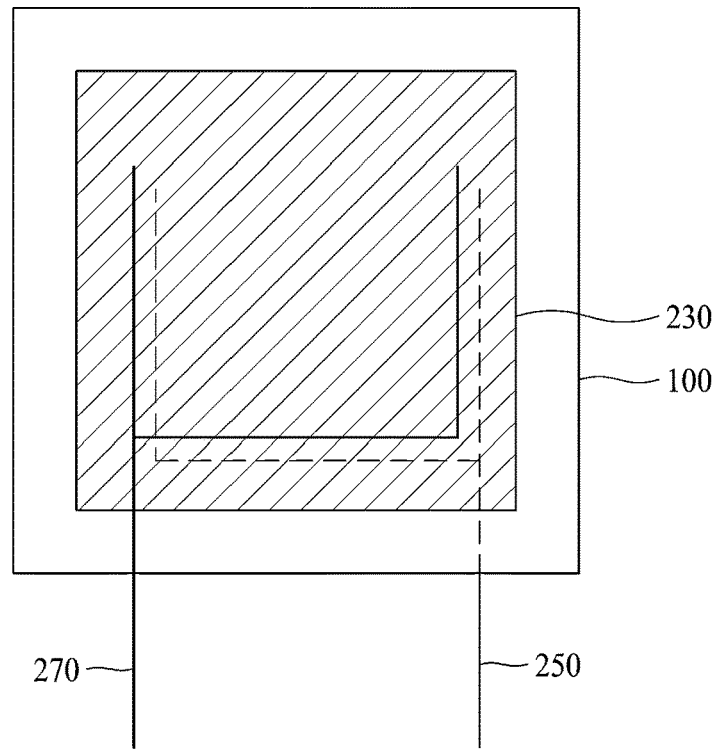
FIGS. 12A and 12B illustrate experimental conditions of sound pressure level characteristics of a display apparatus according to an embodiment of the present disclosure.
Figure 12B:
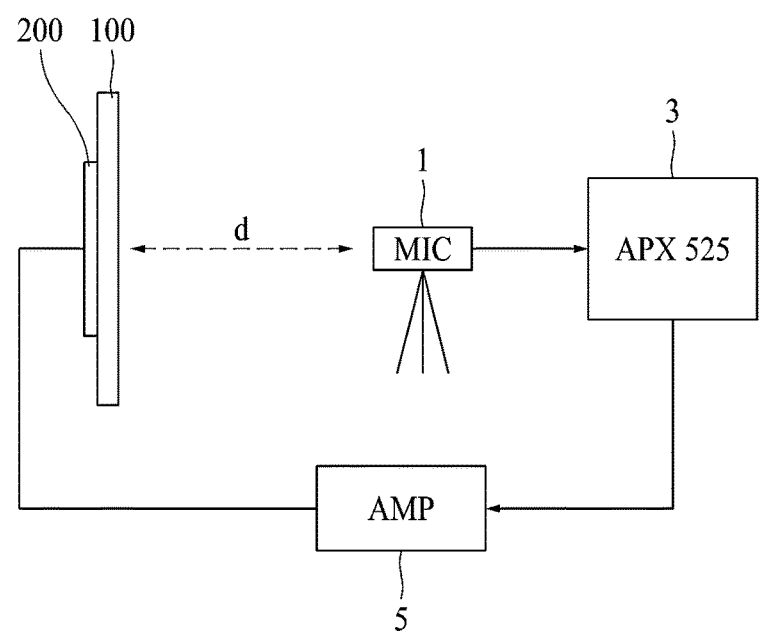

FIGS. 12A and 12B illustrate experimental conditions of sound pressure level characteristics of a display apparatus according to an embodiment of the present disclosure.

With reference to FIG. 12A, the vibration device 200 including the vibration portion 231 is disposed on the rear surface of the plastic display panel 100. For example, the vibration portion 231 of the vibration generator 230 was prepared to have values of 120 mm in width, 60 mm in length, and 0.15 mm in thickness, and the configuration of the vibration portion 231 illustrated in FIG. 4 was applied as the configuration of the inorganic portion 231a, the first organic portion 231b, and the second organic portion 231b. In addition, to compare the sound pressure level characteristics, the first organic portion 231b1 and the second organic portion 231b2 were configured as a single layer of the first organic portion 231b1, or the first organic portion 231b1 and the second organic portion 231b2 were configured as a single layer of the second organic portion 231b2. In addition, the first electrode portion 233 and the second electrode portion 235 were formed as silver electrodes, and a connection line of a first electrode portion 250 and a connection line of a second electrode portion 270 for applying a driving voltage were connected to one surface of the first electrode portion 233 and the second electrode portion 235.

With reference to FIG. 12B, the sound pressure level measurement was performed using the APX525 device of Audio Precision, commercial equipment, and as a sine sweep, a signal in the range of 100 Hz to 20 kHz was amplified through an amplifier AMP and applied to the lead-free piezoelectric device 200, and sound pressure level was measured using a microphone MIC at a position 10 cm away from the display panel, and measured sound pressure level was recorded using APX525 of Audio Precision. The measured sound pressure level was corrected by ⅓ octave smoothing. The sine sweep can be a method of sweeping in a short time, but embodiments of the present disclosure are not limited thereto.

Figure 13:
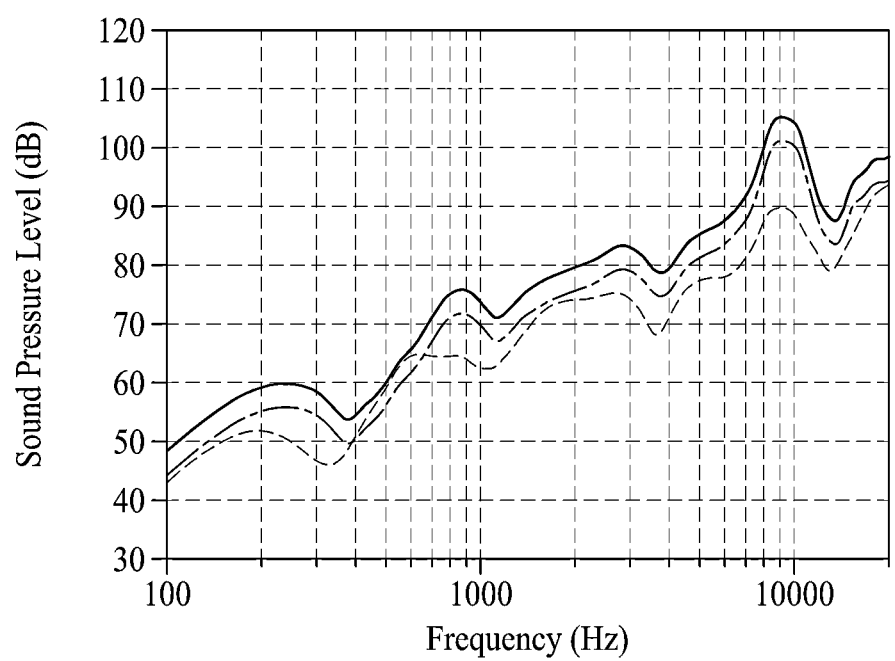
FIG. 13 illustrates sound output characteristics measured in an experimental environment of FIGS. 12A and 12B.

FIG. 13 illustrates sound output characteristics measured in an experimental environment of FIGS. 12A and 12B. In FIG. 13, the horizontal axis represents frequency (hertz, Hz) and the vertical axis represents sound pressure level (decibel, dB).

Table 3 illustrates an average sound pressure level measured by dividing the measured values of sound pressure level according to frequencies measured in FIG. 13 into a low pitched sound band, a middle pitched sound band, and a high pitched sound. band

TABLE 3

| | Frequency band | Second organic portion | First organic portion | First organic portion and second organic portion |
|---|---|---|---|---|
| Low pitched sound band | 100 Hz to 1 kHz | 53.9 | 56.5 | 60.5 |
| Middle pitched sound band | 1 kHz to 10 kHz | 74.9 | 79.6 | 83.6 |
| High pitched sound band | 10 kHz to 20 kHz | 85.7 | 90.6 | 94.6 |
| Full range sound band | 100 Hz to 20 kHz | 67.2 | 71.0 | 75.0 |

In FIG. 13, the sound pressure level characteristics shown by the solid line is based on the inorganic portion 231*a* of the rectangular parallelepiped stripe pattern, the first organic portion 231*b*1 of the stripe pattern disposed adjacent to the inorganic portion 231*a*, and a second organic portion 231*b*2 having a stripe pattern sandwiched between one first organic portion 231*b*1 and another first organic portion 231*b*1 as illustrated in FIG. 4 above. For example, the single inorganic portion 231*a* was set to have a width of 1 mm in the first direction X, a length of 120 mm in the second direction Y, and a thickness of 0.15 mm in the third direction Z. The single inorganic portions 231*a* were set to be spaced apart from each other by a width of 100 μm.

Next, the first organic portion 231*b*1 disposed on one side of the inorganic portion 231*a* was set to have the same dimensions as the single inorganic portion 231*a* except for the width in the first direction X, and the width of the first organic portion 231*b*1 in the first direction X was set to 20 μm. Next, the second organic portion 231*b*2 inserted between the first organic portions 231*b*1 was set to have the same dimensions as the first organic portion 231*b*1 except for the width in the first direction X, and the width of the second organic portion 231*b*2 in the first direction X was set to 40 μm. Accordingly, in the vibration device indicated by the solid line in FIG. 13, the ratio of the widths of the first organic portion 231*b*1 and the second organic portion 231*b*2 in the first direction X can be 0.4 to 0.6, and in a situation where the first organic portion 231*b*1 is formed of a silicone-based polymer and the second organic portion 231*b*1 is formed of an epoxy-based polymer, a total elastic modulus can be about 1.2 GPa.

Next, in FIG. 13, the dotted line represents sound pressure level characteristics of the vibration device having the same configuration as that of the vibration device 200 of the solid line described above, but in which the first organic portion 231*b*1 and the second organic portion 231*b*2 of the vibration portion 231 are 231*b*2 are formed as a single layer of the second organic portion 231*b*2, for comparison of sound pressure level characteristics.

With reference to FIG. 13 and Table 3, an average sound pressure level of the full range sound band in the frequency range of 100 Hz to 20 kHz of the vibration device according to an embodiment of the present disclosure was 75.0 dB. An average sound pressure level of the low pitched sound band in the frequency range of 100 Hz to 1 kHz of the vibration device according to an embodiment of the present disclosure was 60.5 dB. An average sound pressure level of the middle pitched sound band in the frequency range of 1 kHz to 10 kHz of the vibration device according to an embodiment of the present disclosure was 83.6 dB. An average sound pressure level of the high pitched sound band in the frequency range of the 10 kHz to 20 kHz of the vibration device according to an embodiment of the present disclosure was 94.6 dB.

Next, an average sound pressure level of a full range sound band in the frequency range of 100 Hz to 20 kHz of the vibration device in which the first organic portion 231*b*1 and the second organic portion 231*b*2 of the vibration portion 231 are formed as a single layer of the first organic portion 231*b*1 was 71.0 dB, an average sound pressure level of the low pitched sound band in the frequency range of 100 Hz to 1 kHz was 56.5 dB, an average sound pressure level of a middle pitched sound band in the frequency range of 1 kHz to 10 kHz was 79.6 dB, and an average sound pressure level of a high pitched sound range in the frequency range of 10 kHz to 20 kHz was 90.6 dB.

Next, an average sound pressure level of a full range sound band in the frequency range of 100 Hz to 20 kHz of the vibration device in which the first organic portion 231*b*1 and the second organic portion 231*b*2 of the vibration portion 231 are formed as a single layer of the second organic portion 231*b*2 was 67.2 dB, an average sound pressure level of a low pitched sound band in the frequency range of 100 Hz to 1 kHz was 53.9 dB, an average sound pressure level of a middle pitched sound band in the frequency range of 1 kHz to 10 kHz was 74.9 dB, and an average sound pressure level of a high pitched sound range in the frequency range of 10 kHz to 20 kHz was 85.7 dB.

With reference to FIG. 13 and Table 3, in the situation of vibration device in which the second organic portion 231*b*2 having a relatively high elastic modulus is disposed as a single-layer cushioning material between the inorganic portions 231*a*, a maximum vibration displacement of the inorganic portion 231*a* is not secured due to the high elastic modulus of the organic portion 231*b*2, the average sound pressure level of the full range sound band was measured to be 67.2 dB. Since the vibration device according to an embodiment of the present disclosure can secure the maximum vibration displacement of about 5 μm of the inorganic portion 231*a*, it was confirmed that the average sound pressure level of 7.8 dB was increased, compared to the configuration in which the second organic portion 231*b*2 having a high elastic modulus is formed as an organic portion of a single layer.

Next, in the situation of vibration device in which the first organic portion 231*b*1 having a relatively low elastic modulus is disposed as a single-layer cushioning material between the inorganic portions 231*a*, the maximum vibration displacement of the inorganic portion 231*a*, which is about 5 μm, can be secured, and thus, it is confirmed that the average sound pressure level of 3.8 dB was increased, compared with the vibration device in which the second organic portion 231b2 having a relatively high elastic modulus is disposed as a single-layer cushioning material between the inorganic portions 231a.

In addition, since the vibration device according to an embodiment of the present disclosure further includes the second organic portion 231b2 having a high elastic modulus compared with the vibration device in which the first organic portion 231b1 having a relatively low elastic modulus is disposed as a single-layer cushioning material between the inorganic portions 231a, the rigidity of the inorganic portion 231a itself can be supported and the sound pressure level characteristics can be further improved.

A vibration device according to one or more embodiments of the present disclosure can be applied to a vibration device disposed at an apparatus. The vibration device according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, variable apparatuses, sliding apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration device according to an embodiment of the present disclosure can be applied to organic light emitting lighting apparatuses or inorganic light emitting lighting apparatuses. When the vibration device of an embodiment of the present disclosure is applied to lighting apparatuses, the vibration device can act as lighting and a speaker. Also, when the vibration device of an embodiment of the present disclosure is applied to a mobile device, the vibration device can act as one or more of a speaker, a receiver, and a haptic, but embodiments of the present disclosure are not limited thereto.

A vibration device according to one or more embodiments of the present disclosure, and an apparatus including the vibration device can be described as follows.

A vibration device according to an embodiment of the present disclosure includes a vibration generator including a vibration portion, in which the vibration portion includes: a plurality of inorganic portions having piezoelectric characteristics, the plurality of inorganic portions being spaced apart from each other; and an organic portion between at least two inorganic portions among the plurality of inorganic portions, the organic portion having non-piezoelectric characteristics, in which the organic portion includes a first organic portion and a second organic portion, the first organic portion being disposed between one of the plurality of inorganic portions and the second organic portion, in which an elastic modulus of the first organic portion is lower than an elastic modulus of the second organic portion.

According to some embodiments of the present disclosure, the organic portion can be one of a plurality of organic portions, and the plurality of inorganic portions and the plurality of organic portions can be alternately and repeatedly arranged.

According to some embodiments of the present disclosure, the organic portion can have a width in a direction parallel to an arrangement direction of the plurality of inorganic portions, and the first organic portion can account for approximately 40% to 80% of the width of the organic portion, and the second organic portion can account for approximately 20% to 60% of the width of the organic portion.

According to some embodiments of the present disclosure, the organic portion can further include a third organic portion disposed between the first organic portion and the second organic portion.

According to some embodiments of the present disclosure, an elastic modulus of the third organic portion can be equal to or greater than 0.1 GPa and less than 2.0 GPa.

According to some embodiments of the present disclosure, the organic portion can have a width in a direction parallel to an arrangement direction of the plurality of inorganic portions, the first organic portion can account for approximately 20% of the width of the organic portion, the second organic portion can account for approximately 20% to 60% of the width of the organic portion, and the third organic portion can account for approximately 20% to 60% of the width of the organic portion.

According to some embodiments of the present disclosure, the elastic modulus of the first organic portion can be equal to or less than 0.1 GPa.

According to some embodiments of the present disclosure, the elastic modulus of the second organic portion can be equal to or greater than 2.0 GPa.

According to some embodiments of the present disclosure, the plurality of inorganic portions can include a plurality of piezoelectric columns.

According to some embodiments of the present disclosure, a thickness of the first organic portion can be 1 μm to 100 μm.

According to some embodiments of the present disclosure, the vibration generator can further include a first protective member disposed at a first surface of the vibration portion and a second protective member disposed at a second surface of the vibration portion.

According to some embodiments of the present disclosure, the vibration generator can further include a first electrode portion disposed between the vibration portion and the first protective member and a second electrode portion disposed between the vibration portion and the second protective member.

According to some embodiments of the present disclosure, the vibration device can further include a pair of the first organic portions and a pair of third organic portions, and the second organic portion can be disposed between the pair of third organic portions, and the pair of third organic portions can be disposed between the pair of the first organic portions.

According to some embodiments of the present disclosure, an elastic modulus of the pair of third organic portions can be greater than the elastic modulus of the first organic portion and the elastic modulus of the second organic portion.

An apparatus according to an embodiment of the present disclosure includes a vibration object and a vibration generating device disposed on one surface of the vibration object, in which the vibration generating device includes a vibration generator including a vibration portion, in which the vibration portion includes a plurality of inorganic portions having piezoelectric characteristics, the plurality of inorganic portions being spaced apart from each other; and an organic portion between at least two inorganic portions among the plurality of inorganic portions, the organic portion having non-piezoelectric characteristics, in which the organic portion includes a first organic portion and a second organic portion, the first organic portion being disposed between one of the plurality of inorganic portions and the second organic portion, in which an elastic modulus of the first organic portion is lower than an elastic modulus of the second organic portion.

According to some embodiments of the present disclosure, the apparatus can further include a connection member disposed between the vibration object and the vibration generating device.

According to some embodiments of the present disclosure, the vibration object can be one or more of a display panel having pixels configured to display an image, a screen panel on which an image is projected from a display apparatus, a lighting panel, a vibrating plate, wood, plastic, glass, cloth, an interior material of a vehicle, a glass window of a vehicle, an interior ceiling of a building, a glass window of a building, an interior material of aircraft, and a glass window of aircraft.

According to some embodiments of the present disclosure, the apparatus can further include a support member disposed at a rear surface of the display panel.

A display apparatus according to an embodiment of the present disclosure includes a display panel configured to display an image, an adhesive member disposed on a rear surface of the display panel, and a vibration generator including a plurality of inorganic portions having piezoelectric characteristics, the plurality of inorganic portions being spaced apart from each other and a plurality of organic portions having non-piezoelectric characteristics, and the plurality of organic portions include a first organic portion and a second organic portion, the first organic portion being disposed between one of the plurality of inorganic portions and the second organic portion, an elastic modulus of the first organic portion is lower than an elastic modulus of the second organic portion, and the adhesive member is disposed between the display panel and the vibration generator.

According to some embodiments of the present disclosure, the display apparatus can further include a first protective member and a second protective member, and the vibration generator can be disposed between the first protective member and the second protective member.

An apparatus according to an embodiment of the present disclosure can generate sound by vibrating the display panel and can output the sound having improved sound pressure level characteristics to the front of a display panel (or a display apparatus) or a vibration object.

In the apparatus according to an embodiment of the present disclosure, characteristics of low pitched sound band, middle pitched sound band, and high pitched sound band sounds generated according to displacement of a display panel or a vibration object according to an increase in amplitude displacement of the display panel can be improved.

A vibration device according to an embodiment of the present disclosure can improve the characteristics of the low pitched sound band, middle pitched sound band, and high pitched sound band sounds of sound generated according to displacement of a vibration plate.

It will be apparent to those skilled in the art that various modifications and variations may be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A vibration device, comprising:
a vibration generator including a vibration portion,
wherein the vibration portion includes:
   a plurality of inorganic portions having piezoelectric characteristics, the plurality of inorganic portions being spaced apart from each other; and
   an organic portion disposed between at least two inorganic portions among the plurality of inorganic portions, the organic portion having non-piezoelectric characteristics,
wherein the organic portion includes a first organic portion and a second organic portion, the first organic portion being disposed between one of the plurality of inorganic portions and the second organic portion, and
wherein an elastic modulus of the first organic portion is lower than an elastic modulus of the second organic portion.

2. The vibration device of claim 1, wherein the organic portion is one of a plurality of organic portions, and
wherein the plurality of inorganic portions and the plurality of organic portions are alternately and repeatedly arranged.

3. The vibration device of claim 2, wherein the organic portion has a width in a direction parallel to an arrangement direction of the plurality of inorganic portions, and
wherein the first organic portion accounts for approximately 40% to 80% of the width of the organic portion, and the second organic portion accounts for approximately 20% to 60% of the width the organic portion.

4. The vibration device of claim 2, wherein the organic portion further includes a third organic portion disposed between the first organic portion and the second organic portion.

5. The vibration device of claim 4, wherein an elastic modulus of the third organic portion is equal to or greater than 0.1 GPa and less than 2.0 GPa.

6. The vibration device of claim 4, wherein the organic portion has a width in a direction parallel to an arrangement direction of the plurality of inorganic portions,
wherein the first organic portion accounts for approximately 20% of the width of the organic portion,
wherein the second organic portion accounts for approximately 20% to 60% of the width of the organic portion, and
wherein the third organic portion accounts for approximately 20% to 60% of the width of the organic portion.

7. The vibration device of claim 1, wherein the elastic modulus of the first organic portion is equal to or less than 0.1 GPa.

8. The vibration device of claim 1, wherein the elastic modulus of the second organic portion is equal to or greater than 2.0 GPa.

9. The vibration device of claim 1, wherein the plurality of inorganic portions include a plurality of piezoelectric columns.

10. The vibration device of claim 1, wherein a thickness of the first organic portion is 1 μm to 100 μm.

11. The vibration device of claim 1, wherein the vibration generator further includes:
a first protective member disposed on a first surface of the vibration portion; and
a second protective member disposed on a second surface of the vibration portion.

12. The vibration device of claim 11, wherein the vibration generator further includes:
a first electrode portion disposed between the vibration portion and the first protective member; and a second electrode portion disposed between the vibration portion and the second protective member.

13. The vibration device of claim 1, further comprising:
a pair of the first organic portions; and
a pair of third organic portions,
wherein the second organic portion is disposed between the pair of third organic portions, and the pair of third organic portions is disposed between the pair of the first organic portions.

14. The vibration device of claim 1, wherein an elastic modulus of the pair of third organic portions is greater than the elastic modulus of the first organic portion and the elastic modulus of the second organic portion.

15. An apparatus, comprising:
a vibration object; and
the vibration device according to claim 1 and disposed on one surface of the vibration object.

16. The apparatus of claim 15, further comprising:
a connection member disposed between the vibration object and the vibration device.

17. The apparatus of claim 15, wherein the vibration object includes at least one of a display panel having pixels configured to display an image, a screen panel on which an image is projected from a display apparatus, a lighting panel, a vibrating plate, wood, plastic, glass, cloth, an interior material of a vehicle, a glass window of a vehicle, an interior ceiling of a building, a glass window of a building, an interior material of aircraft, or a glass window of aircraft.

18. The apparatus of claim 17, further comprising:
a support member disposed at a rear surface of the display panel.

19. A display apparatus, comprising:
a display panel configured to display an image;
an adhesive member disposed on a rear surface of the display panel; and
a vibration generator including:
  a plurality of inorganic portions having piezoelectric characteristics, the plurality of inorganic portions being spaced apart from each other; and
  a plurality of organic portions having non-piezoelectric characteristics,
wherein the plurality of organic portions include a first organic portion and a second organic portion, the first organic portion being disposed between one of the plurality of inorganic portions and the second organic portion,
wherein an elastic modulus of the first organic portion is lower than an elastic modulus of the second organic portion, and
wherein the adhesive member is disposed between the display panel and the vibration generator.

20. The display apparatus of claim 19, further comprising:
a first protective member; and
a second protective member,
wherein the vibration generator is disposed between the first protective member and the second protective member.

* * * * *